US009294785B2

(12) United States Patent
Brockmann et al.

(10) Patent No.: US 9,294,785 B2
(45) Date of Patent: Mar. 22, 2016

(54) SYSTEM AND METHOD FOR EXPLOITING SCENE GRAPH INFORMATION IN CONSTRUCTION OF AN ENCODED VIDEO SEQUENCE

(71) Applicant: ACTIVEVIDEO NETWORKS, INC., San Jose, CA (US)

(72) Inventors: Ronald Alexander Brockmann, Utrecht (NL); Anuj Dev, Amsterdam (NL); Maarten Hoeben, Amersfoort (NL)

(73) Assignee: ACTIVEVIDEO NETWORKS, INC., San Jose, CA (US)

( * ) Notice: Subject to any disclaimer, the term of this patent is extended or adjusted under 35 U.S.C. 154(b) by 0 days.

(21) Appl. No.: 14/262,674

(22) Filed: Apr. 25, 2014

(65) Prior Publication Data

US 2014/0362930 A1    Dec. 11, 2014

Related U.S. Application Data

(63) Continuation-in-part of application No. 13/911,948, filed on Jun. 6, 2013, now Pat. No. 9,219,922.

(51) Int. Cl.
*G06K 9/36* (2006.01)
*H04N 19/87* (2014.01)
(Continued)

(52) U.S. Cl.
CPC ............. *H04N 19/87* (2014.11); *H04N 19/103* (2014.11); *H04N 19/167* (2014.11); *H04N 19/174* (2014.11); *G06T 9/004* (2013.01); *H04N 19/537* (2014.11)

(58) Field of Classification Search
CPC ... H04N 19/167; H04N 19/87; H04N 19/537; H04N 19/174; H04N 19/137; H04N 19/159; H04N 19/16; H04N 19/176; H04N 19/48; H04N 19/147; H04N 19/103; G06T 9/004
USPC ........................................................ 382/236
See application file for complete search history.

(56) References Cited

U.S. PATENT DOCUMENTS 3,889,050 A    6/1975  Thompson
3,934,079 A    1/1976  Barnhart
(Continued)

FOREIGN PATENT DOCUMENTS

AT              191599 T       4/2000
AT              198969 T       2/2001
(Continued)

OTHER PUBLICATIONS

ActiveVideo Networks Inc., International Preliminary Report on Patentability, PCT/US2013/020769, Jul. 24, 2014, 6 pgs.
(Continued)

*Primary Examiner* — Ali Bayat
(74) *Attorney, Agent, or Firm* — Morgan, Lewis & Bockius LLP

(57) ABSTRACT

A system method and computer program product for creating a composited video frame sequence for an application. A current scene state for the application is compared to a previous scene state wherein each scene state includes a plurality of objects. A video construction engine determines if properties of one or more objects have changed based upon a comparison of the scene states. If properties of one or more objects have changed based upon the comparison, the delta between the object's states is determined and this information is used by a fragment encoding module if the fragment has not been encoded before. The information is used to define, for example, the motion vectors for use by the fragment encoding module in construction of the fragments to be used by the stitching module to build the composited video frame sequence.

9 Claims, 13 Drawing Sheets

(51) Int. Cl.
*H04N 19/103* (2014.01)
*H04N 19/174* (2014.01)
*H04N 19/167* (2014.01)
*G06T 9/00* (2006.01)
*H04N 19/537* (2014.01)

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweety et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr. et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |
| 5,133,079 A | 7/1992 | Ballantyne et al. |
| 5,136,411 A | 8/1992 | Paik et al. |
| 5,142,575 A | 8/1992 | Farmer et al. |
| 5,144,448 A | 9/1992 | Hornbaker, III et al. |
| 5,155,591 A | 10/1992 | Wachob |
| 5,172,413 A | 12/1992 | Bradley et al. |
| 5,191,410 A | 3/1993 | McCalley et al. |
| 5,195,092 A | 3/1993 | Wilson et al. |
| 5,208,665 A | 5/1993 | McCalley et al. |
| 5,220,420 A | 6/1993 | Hoarty et al. |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Letteral et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |

(56) References Cited

U.S. PATENT DOCUMENTS

| | | | |
|---|---|---|---|
| 5,319,455 | A | 6/1994 | Hoarty et al. |
| 5,319,707 | A | 6/1994 | Wasilewski et al. |
| 5,321,440 | A | 6/1994 | Yanagihara et al. |
| 5,321,514 | A | 6/1994 | Martinez |
| 5,351,129 | A | 9/1994 | Lai |
| 5,355,162 | A | 10/1994 | Yazolino et al. |
| 5,359,601 | A | 10/1994 | Wasilewski et al. |
| 5,361,091 | A | 11/1994 | Hoarty et al. |
| 5,371,532 | A | 12/1994 | Gelman et al. |
| 5,404,393 | A | 4/1995 | Remillard |
| 5,408,274 | A | 4/1995 | Chang et al. |
| 5,410,343 | A | 4/1995 | Coddington et al. |
| 5,410,344 | A | 4/1995 | Graves et al. |
| 5,412,415 | A | 5/1995 | Cook et al. |
| 5,412,720 | A | 5/1995 | Hoarty |
| 5,418,559 | A | 5/1995 | Blahut |
| 5,422,674 | A | 6/1995 | Hooper et al. |
| 5,422,887 | A | 6/1995 | Diepstraten et al. |
| 5,442,389 | A | 8/1995 | Blahut et al. |
| 5,442,390 | A | 8/1995 | Hooper et al. |
| 5,442,700 | A | 8/1995 | Snell et al. |
| 5,446,490 | A | 8/1995 | Blahut et al. |
| 5,469,283 | A | 11/1995 | Vinel et al. |
| 5,469,431 | A | 11/1995 | Wendorf et al. |
| 5,471,263 | A | 11/1995 | Odaka |
| 5,481,542 | A | 1/1996 | Logston et al. |
| 5,485,197 | A | 1/1996 | Hoarty |
| 5,487,066 | A | 1/1996 | McNamara et al. |
| 5,493,638 | A | 2/1996 | Hooper et al. |
| 5,495,283 | A | 2/1996 | Cowe |
| 5,495,295 | A | 2/1996 | Long |
| 5,497,187 | A | 3/1996 | Banker et al. |
| 5,517,250 | A | 5/1996 | Hoogenboom et al. |
| 5,526,034 | A | 6/1996 | Hoarty et al. |
| 5,528,281 | A | 6/1996 | Grady et al. |
| 5,537,397 | A | 7/1996 | Abramson |
| 5,537,404 | A | 7/1996 | Bentley et al. |
| 5,539,449 | A | 7/1996 | Blahut et al. |
| RE35,314 | E | 8/1996 | Logg |
| 5,548,340 | A | 8/1996 | Bertram |
| 5,550,578 | A | 8/1996 | Hoarty et al. |
| 5,557,316 | A | 9/1996 | Hoarty et al. |
| 5,559,549 | A | 9/1996 | Hendricks et al. |
| 5,561,708 | A | 10/1996 | Remillard |
| 5,570,126 | A | 10/1996 | Blahut et al. |
| 5,570,363 | A | 10/1996 | Holm |
| 5,579,143 | A | 11/1996 | Huber |
| 5,581,653 | A | 12/1996 | Todd |
| 5,583,927 | A | 12/1996 | Ely et al. |
| 5,587,734 | A | 12/1996 | Lauder et al. |
| 5,589,885 | A | 12/1996 | Ooi |
| 5,592,470 | A | 1/1997 | Rudrapatna et al. |
| 5,594,507 | A | 1/1997 | Hoarty |
| 5,594,723 | A | 1/1997 | Tibi |
| 5,594,938 | A | 1/1997 | Engel |
| 5,596,693 | A | 1/1997 | Needle et al. |
| 5,600,364 | A | 2/1997 | Hendricks et al. |
| 5,600,573 | A | 2/1997 | Hendricks et al. |
| 5,608,446 | A | 3/1997 | Carr et al. |
| 5,617,145 | A | 4/1997 | Huang et al. |
| 5,621,464 | A | 4/1997 | Teo et al. |
| 5,625,404 | A | 4/1997 | Grady et al. |
| 5,630,757 | A | 5/1997 | Gagin et al. |
| 5,631,693 | A | 5/1997 | Wunderlich et al. |
| 5,631,846 | A | 5/1997 | Szurkowski |
| 5,632,003 | A | 5/1997 | Davidson et al. |
| 5,649,283 | A | 7/1997 | Galler et al. |
| 5,668,592 | A | 9/1997 | Spaulding, II |
| 5,668,599 | A | 9/1997 | Cheney et al. |
| 5,708,767 | A | 1/1998 | Yeo et al. |
| 5,710,815 | A | 1/1998 | Ming et al. |
| 5,712,906 | A | 1/1998 | Grady et al. |
| 5,740,307 | A | 4/1998 | Lane |
| 5,742,289 | A | 4/1998 | Naylor et al. |
| 5,748,234 | A | 5/1998 | Lippincott |
| 5,754,941 | A | 5/1998 | Sharpe et al. |
| 5,786,527 | A | 7/1998 | Tarte |
| 5,790,174 | A | 8/1998 | Richard, III et al. |
| 5,802,283 | A | 9/1998 | Grady et al. |
| 5,812,665 | A | 9/1998 | Hoarty et al. |
| 5,812,786 | A | 9/1998 | Seazholtz et al. |
| 5,815,604 | A | 9/1998 | Simons et al. |
| 5,818,438 | A | 10/1998 | Howe et al. |
| 5,821,945 | A | 10/1998 | Yeo et al. |
| 5,822,537 | A | 10/1998 | Katseff et al. |
| 5,828,371 | A | 10/1998 | Cline et al. |
| 5,844,594 | A | 12/1998 | Ferguson |
| 5,845,083 | A | 12/1998 | Hamadani et al. |
| 5,862,325 | A | 1/1999 | Reed et al. |
| 5,864,820 | A | 1/1999 | Case |
| 5,867,208 | A | 2/1999 | McLaren |
| 5,883,661 | A | 3/1999 | Hoarty |
| 5,903,727 | A | 5/1999 | Nielsen |
| 5,903,816 | A | 5/1999 | Broadwin et al. |
| 5,905,522 | A | 5/1999 | Lawler |
| 5,907,681 | A | 5/1999 | Bates et al. |
| 5,917,822 | A | 6/1999 | Lyles et al. |
| 5,946,352 | A | 8/1999 | Rowlands et al. |
| 5,952,943 | A | 9/1999 | Walsh et al. |
| 5,959,690 | A | 9/1999 | Toebes et al. |
| 5,961,603 | A | 10/1999 | Kunkel et al. |
| 5,963,203 | A | 10/1999 | Goldberg et al. |
| 5,966,163 | A | 10/1999 | Lin et al. |
| 5,978,756 | A | 11/1999 | Walker et al. |
| 5,982,445 | A | 11/1999 | Eyer et al. |
| 5,990,862 | A | 11/1999 | Lewis |
| 5,995,146 | A | 11/1999 | Rasmusse |
| 5,995,488 | A | 11/1999 | Kalhunte et al. |
| 5,999,970 | A | 12/1999 | Krisbergh et al. |
| 6,014,416 | A | 1/2000 | Shin et al. |
| 6,021,386 | A | 2/2000 | Davis et al. |
| 6,031,989 | A | 2/2000 | Cordell |
| 6,034,678 | A | 3/2000 | Hoarty et al. |
| 6,049,539 | A | 4/2000 | Lee et al. |
| 6,049,831 | A | 4/2000 | Gardell et al. |
| 6,052,555 | A | 4/2000 | Ferguson |
| 6,055,314 | A | 4/2000 | Spies et al. |
| 6,055,315 | A | 4/2000 | Doyle et al. |
| 6,064,377 | A | 5/2000 | Hoarty et al. |
| 6,078,328 | A | 6/2000 | Schumann et al. |
| 6,084,908 | A | 7/2000 | Chiang et al. |
| 6,100,883 | A | 8/2000 | Hoarty |
| 6,108,625 | A | 8/2000 | Kim |
| 6,131,182 | A | 10/2000 | Beakes et al. |
| 6,141,645 | A | 10/2000 | Chi-Min et al. |
| 6,141,693 | A | 10/2000 | Perlman et al. |
| 6,144,698 | A | 11/2000 | Poon et al. |
| 6,167,084 | A | 12/2000 | Wang et al. |
| 6,169,573 | B1 | 1/2001 | Sampath-Kumar et al. |
| 6,177,931 | B1 | 1/2001 | Alexander et al. |
| 6,182,072 | B1 | 1/2001 | Leak et al. |
| 6,184,878 | B1 | 2/2001 | Alonso et al. |
| 6,192,081 | B1 | 2/2001 | Chiang et al. |
| 6,198,822 | B1 | 3/2001 | Doyle et al. |
| 6,205,582 | B1 | 3/2001 | Hoarty |
| 6,226,041 | B1 | 5/2001 | Florencio et al. |
| 6,236,730 | B1 | 5/2001 | Cowieson et al. |
| 6,243,418 | B1 | 6/2001 | Kim |
| 6,253,238 | B1 | 6/2001 | Lauder et al. |
| 6,256,047 | B1 | 7/2001 | Isobe et al. |
| 6,259,826 | B1 | 7/2001 | Pollard et al. |
| 6,266,369 | B1 | 7/2001 | Wang et al. |
| 6,266,684 | B1 | 7/2001 | Kraus et al. |
| 6,275,496 | B1 | 8/2001 | Burns et al. |
| 6,292,194 | B1 | 9/2001 | Powell, III |
| 6,305,020 | B1 | 10/2001 | Hoarty et al. |
| 6,317,151 | B1 | 11/2001 | Ohsuga et al. |
| 6,317,885 | B1 | 11/2001 | Fries |
| 6,349,284 | B1 | 2/2002 | Park et al. |
| 6,385,771 | B1 | 5/2002 | Gordon |
| 6,386,980 | B1 | 5/2002 | Nishino et al. |
| 6,389,075 | B2 | 5/2002 | Wang et al. |
| 6,389,218 | B2 | 5/2002 | Gordon et al. |
| 6,415,031 | B1 | 7/2002 | Colligan et al. |

(56) References Cited

U.S. PATENT DOCUMENTS

| | | | |
|---|---|---|---|
| 6,415,437 B1 | 7/2002 | Ludvig et al. |
| 6,438,140 B1 | 8/2002 | Jungers et al. |
| 6,446,037 B1 | 9/2002 | Fielder et al. |
| 6,459,427 B1 | 10/2002 | Mao et al. |
| 6,477,182 B2 | 11/2002 | Calderone |
| 6,480,210 B1 | 11/2002 | Martino et al. |
| 6,481,012 B1 | 11/2002 | Gordon et al. |
| 6,512,793 B1 | 1/2003 | Maeda |
| 6,525,746 B1 | 2/2003 | Lau et al. |
| 6,536,043 B1 | 3/2003 | Guedalia |
| 6,557,041 B2 | 4/2003 | Mallart |
| 6,560,496 B1 | 5/2003 | Michnener |
| 6,564,378 B1 | 5/2003 | Satterfield et al. |
| 6,578,201 B1 | 6/2003 | LaRocca et al. |
| 6,579,184 B1 | 6/2003 | Tanskanen |
| 6,584,153 B1 | 6/2003 | Gordon et al. |
| 6,588,017 B1 | 7/2003 | Calderone |
| 6,598,229 B2 | 7/2003 | Smyth et al. |
| 6,604,224 B1 | 8/2003 | Armstrong et al. |
| 6,614,442 B1 | 9/2003 | Ouyang et al. |
| 6,621,870 B1 | 9/2003 | Gordon et al. |
| 6,625,574 B1 | 9/2003 | Taniguchi et al. |
| 6,639,896 B1 | 10/2003 | Goode et al. |
| 6,645,076 B1 | 11/2003 | Sugai |
| 6,651,252 B1 | 11/2003 | Gordon et al. |
| 6,657,647 B1 | 12/2003 | Bright |
| 6,675,385 B1 | 1/2004 | Wang |
| 6,675,387 B1 | 1/2004 | Boucher |
| 6,681,326 B2 | 1/2004 | Son et al. |
| 6,681,397 B1 | 1/2004 | Tsai et al. |
| 6,684,400 B1 | 1/2004 | Goode et al. |
| 6,687,663 B1 | 2/2004 | McGrath et al. |
| 6,691,208 B2 | 2/2004 | Dandrea et al. |
| 6,697,376 B1 | 2/2004 | Son et al. |
| 6,704,359 B1 | 3/2004 | Bayrakeri et al. |
| 6,717,600 B2 | 4/2004 | Dutta et al. |
| 6,718,552 B1 | 4/2004 | Goode |
| 6,721,794 B2 | 4/2004 | Taylor et al. |
| 6,721,956 B2 | 4/2004 | Wsilewski |
| 6,727,929 B1 | 4/2004 | Bates et al. |
| 6,731,605 B1 | 5/2004 | Deshpande |
| 6,732,370 B1 | 5/2004 | Gordon et al. |
| 6,747,991 B1 | 6/2004 | Hemy et al. |
| 6,754,271 B1 | 6/2004 | Gordon et al. |
| 6,754,905 B2 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,813,690 B1 | 11/2004 | Lango et al. |
| 6,817,947 B2 | 11/2004 | Tanskanen |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,016,540 B1 * | 3/2006 | Gong et al. ................. 382/225 |
| 7,030,890 B1 | 4/2006 | Jouet et al. |
| 7,031,385 B1 * | 4/2006 | Inoue et al. ............. 375/240.08 |
| 7,050,113 B2 | 5/2006 | Campisano et al. |
| 7,089,577 B1 | 8/2006 | Rakib et al. |
| 7,093,028 B1 | 8/2006 | Shao et al. |
| 7,095,402 B2 | 8/2006 | Kunil et al. |
| 7,114,167 B2 | 9/2006 | Slemmer et al. |
| 7,146,615 B1 | 12/2006 | Hervet et al. |
| 7,151,782 B1 | 12/2006 | Oz et al. |
| 7,158,676 B1 | 1/2007 | Rainsford |
| 7,200,836 B2 | 4/2007 | Brodersen et al. |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,360,230 B1 | 4/2008 | Paz et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,444,418 B2 | 10/2008 | Chou et al. |
| 7,500,235 B2 | 3/2009 | Maynard et al. |
| 7,508,941 B1 | 3/2009 | O'Toole, Jr. et al. |
| 7,512,577 B2 | 3/2009 | Slemmer et al. |
| 7,543,073 B2 | 6/2009 | Chou et al. |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,757,157 B1 | 7/2010 | Fukuda |
| 7,830,388 B1 | 11/2010 | Lu |
| 7,840,905 B1 | 11/2010 | Weber et al. |
| 7,936,819 B2 | 5/2011 | Craig et al. |
| 7,941,645 B1 | 5/2011 | Riach et al. |
| 7,970,263 B1 | 6/2011 | Asch |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,243,630 B2 | 8/2012 | Luo et al. |
| 8,270,439 B2 | 9/2012 | Herr et al. |
| 8,284,842 B2 | 10/2012 | Craig et al. |
| 8,296,424 B2 | 10/2012 | Malloy et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 | 12/2013 | Weaver et al. |
| 8,656,430 B2 | 2/2014 | Doyle |
| 2001/0008845 A1 | 7/2001 | Kusuda et al. |
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0054578 A1 | 5/2002 | Zhang et al. |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0095689 A1 | 7/2002 | Novak |
| 2002/0105531 A1 | 8/2002 | Niemi |
| 2002/0108121 A1 | 8/2002 | Alao et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |

(56) References Cited

U.S. PATENT DOCUMENTS

| | | |
|---|---|---|
| 2002/0171765 A1 | 11/2002 | Waki et al. |
| 2002/0175931 A1 | 11/2002 | Holtz et al. |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0018796 A1 | 1/2003 | Chou et al. |
| 2003/0020671 A1 | 1/2003 | Santoro et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0039398 A1 | 2/2003 | McIntyre |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0071792 A1 | 4/2003 | Safadi |
| 2003/0072372 A1 | 4/2003 | Shen et al. |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0107443 A1 | 6/2003 | Yamamoto |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi |
| 2003/0126611 A1 | 7/2003 | Chernock et al. |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1 | 7/2004 | Mock |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0261106 A1 | 12/2004 | Hoffman |
| 2004/0261114 A1 | 12/2004 | Addington et al. |
| 2004/0268419 A1 | 12/2004 | Danker et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0155063 A1 | 7/2005 | Bayrakeri |
| 2005/0160088 A1 | 7/2005 | Scallan et al. |
| 2005/0166257 A1 | 7/2005 | Feinleib et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1 | 9/2005 | Black |
| 2005/0216940 A1 | 9/2005 | Black |
| 2005/0226426 A1 | 10/2005 | Oomen et al. |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1 | 6/2006 | Cho et al. |
| 2006/0161538 A1 | 7/2006 | Kiilerich |
| 2006/0173985 A1 | 8/2006 | Moore |
| 2006/0174026 A1 | 8/2006 | Robinson et al. |
| 2006/0174289 A1 | 8/2006 | Theberge |
| 2006/0195884 A1 | 8/2006 | van Zoest et al. |
| 2006/0203913 A1 | 9/2006 | Kim et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0256865 A1 | 11/2006 | Westerman |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig |
| 2007/0025639 A1 | 2/2007 | Zhou et al. |
| 2007/0033528 A1 | 2/2007 | Merrit et al. |
| 2007/0033631 A1 | 2/2007 | Gordon et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ording et al. |
| 2007/0162953 A1 | 7/2007 | Bollinger et al. |
| 2007/0172061 A1 | 7/2007 | Pinder |
| 2007/0174790 A1 | 7/2007 | Jing et al. |
| 2007/0178243 A1 | 8/2007 | Houck et al. |
| 2007/0234220 A1 | 10/2007 | Khan et al. |
| 2007/0237232 A1 | 10/2007 | Chang et al. |
| 2007/0300280 A1 | 12/2007 | Turner et al. |
| 2008/0046928 A1 | 2/2008 | Poling et al. |
| 2008/0052742 A1 | 2/2008 | Kopf et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |
| 2008/0094368 A1 | 4/2008 | Ording et al. |
| 2008/0097953 A1 | 4/2008 | Levy et al. |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0154583 A1 | 6/2008 | Goto et al. |
| 2008/0163059 A1 | 7/2008 | Craner |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0178125 A1 | 7/2008 | Elsbree et al. |
| 2008/0178243 A1 | 7/2008 | Dong et al. |

(56) References Cited

U.S. PATENT DOCUMENTS

| | | | |
|---|---|---|---|
| 2008/0178249 A1 | 7/2008 | Gordon et al. |
| 2008/0181221 A1 | 7/2008 | Kampmann et al. |
| 2008/0184120 A1 | 7/2008 | O-Brien-Strain et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0222199 A1 | 9/2008 | Tiu et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0246759 A1 | 10/2008 | Summers |
| 2008/0253440 A1 | 10/2008 | Srinivasan et al. |
| 2008/0271080 A1 | 10/2008 | Grossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172757 A1 | 7/2009 | Aldrey et al. |
| 2009/0178098 A1 | 7/2009 | Westbrook et al. |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverly et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271512 A1 | 10/2009 | Jorgensen |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0328109 A1 | 12/2009 | Pavlovskaia et al. |
| 2010/0033638 A1 | 2/2010 | O'Donnell et al. |
| 2010/0035682 A1 | 2/2010 | Gentile et al. |
| 2010/0058404 A1 | 3/2010 | Rouse |
| 2010/0067571 A1 | 3/2010 | White et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131996 A1 | 5/2010 | Gauld |
| 2010/0146139 A1 | 6/2010 | Brockmann |
| 2010/0158109 A1 | 6/2010 | Dahlby et al. |
| 2010/0161825 A1 | 6/2010 | Ronca et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | DeLuca et al. |
| 2010/0254370 A1 | 10/2010 | Jana et al. |
| 2010/0265344 A1* | 10/2010 | Velarde et al. ........... 348/208.16 |
| 2010/0325655 A1 | 12/2010 | Perez |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0096828 A1 | 4/2011 | Chen et al. |
| 2011/0107375 A1 | 5/2011 | Stahl et al. |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0167468 A1 | 7/2011 | Lee et al. |
| 2011/0191684 A1 | 8/2011 | Greenberg |
| 2011/0231878 A1 | 9/2011 | Hunter et al. |
| 2011/0243024 A1 | 10/2011 | Osterling et al. |
| 2011/0258584 A1 | 10/2011 | Williams et al. |
| 2011/0289536 A1 | 11/2011 | Poder et al. |
| 2011/0296312 A1 | 12/2011 | Boyer et al. |
| 2011/0317982 A1 | 12/2011 | Xu et al. |
| 2012/0023126 A1 | 1/2012 | Jin et al. |
| 2012/0030212 A1 | 2/2012 | Koopmans et al. |
| 2012/0137337 A1 | 5/2012 | Sigmon et al. |
| 2012/0204217 A1 | 8/2012 | Regis et al. |
| 2012/0209815 A1 | 8/2012 | Carson et al. |
| 2012/0224641 A1 | 9/2012 | Haberman et al. |
| 2012/0257671 A1 | 10/2012 | Brockmann et al. |
| 2013/0003826 A1 | 1/2013 | Craig et al. |
| 2013/0071095 A1 | 3/2013 | Chauvier et al. |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0254308 A1 | 9/2013 | Rose et al. |
| 2013/0272394 A1 | 10/2013 | Brockmann et al. |
| 2013/0304818 A1 | 11/2013 | Brumleve et al. |
| 2014/0033036 A1 | 1/2014 | Gaur et al. |
| 2014/0081954 A1 | 3/2014 | Elizarov |
| 2014/0267074 A1 | 9/2014 | Balci |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |
| AU | 2010339376 A1 | 8/2012 |
| AU | 2011249132 A1 | 11/2012 |
| AU | 2011258972 A1 | 11/2012 |
| AU | 2011315950 A1 | 5/2013 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |

(56) References Cited

FOREIGN PATENT DOCUMENTS

| | | |
|---|---|---|
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| CN | 103647980 A | 3/2014 |
| DE | 4408355 A1 | 10/1994 |
| DE | 69516139 | 12/2000 |
| DE | 69132518 | 9/2001 |
| DE | 69333207 | 7/2004 |
| DE | 98961961 | 8/2007 |
| DE | 602008001596 | 8/2010 |
| DE | 602006015650 | 9/2010 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0 881 808 A2 | 12/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 | 12/2011 |
| IL | 222829 | 12/2012 |
| IL | 222830 | 12/2012 |
| IL | 225525 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 04-373286 A | 12/1992 |
| JP | 06-054324 A | 2/1994 |
| JP | 7015720 A | 1/1995 |
| JP | 7-160292 A | 6/1995 |
| JP | 7160292 A | 6/1995 |
| JP | 8095599 A | 4/1996 |
| JP | 8-265704 A | 10/1996 |
| JP | 8265704 A | 10/1996 |
| JP | 10-228437 A | 8/1998 |
| JP | 11-134273 A | 5/1999 |
| JP | H11-261966 | 9/1999 |
| JP | 2000-152234 | 5/2000 |
| JP | 2001-203995 A | 7/2001 |
| JP | 2001-245271 | 9/2001 |
| JP | 2001-245291 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-319991 | 10/2002 |
| JP | 2003-506763 A | 2/2003 |
| JP | 2003-087785 | 3/2003 |
| JP | 2004-501445 A | 1/2004 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-312283 | 11/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-156996 | 6/2005 |
| JP | 2005-519382 | 6/2005 |
| JP | 2005-523479 A | 8/2005 |
| JP | 2005-309752 | 11/2005 |
| JP | 2006-067280 | 3/2006 |
| JP | 2006-512838 | 4/2006 |
| JP | 2007-129296 | 5/2007 |
| JP | 2007-522727 | 8/2007 |
| JP | 11-88419 | 9/2007 |

(56) References Cited

FOREIGN PATENT DOCUMENTS

| | | |
|---|---|---|
| JP | 2008-523880 | 7/2008 |
| JP | 2008-535622 A | 9/2008 |
| JP | 04252727 B2 | 4/2009 |
| JP | 2009-543386 A | 12/2009 |
| JP | 2012-080593 A | 4/2012 |
| JP | 04996603 B2 | 8/2012 |
| JP | 05121711 B2 | 1/2013 |
| JP | 53-004612 A | 10/2013 |
| JP | 05331008 B2 | 10/2013 |
| JP | 05405819 B2 | 2/2014 |
| KR | 10-2005-0001362 | 1/2005 |
| KR | 10-2005-0085827 | 8/2005 |
| KR | 2006067924 A | 6/2006 |
| KR | 10-2006-0095821 | 9/2006 |
| KR | 2007038111 A | 4/2007 |
| KR | 20080001298 A | 1/2008 |
| KR | 2008024189 A | 3/2008 |
| KR | 2010111739 A | 10/2010 |
| KR | 2010120187 A | 11/2010 |
| KR | 2010127240 A | 12/2010 |
| KR | 2011030640 A | 3/2011 |
| KR | 2011129477 A | 12/2011 |
| KR | 20120112683 A | 10/2012 |
| KR | 2013061149 A | 6/2013 |
| KR | 2013113925 A | 10/2013 |
| KR | 1333200 B1 | 11/2013 |
| KR | 2008045154 A | 11/2013 |
| KR | 2013138263 A | 12/2013 |
| NL | 1032594 C2 | 4/2008 |
| NL | 1033929 C1 | 4/2008 |
| NL | 2004670 A | 11/2011 |
| NL | 2004780 A | 1/2012 |
| NZ | 239969 A | 12/1994 |
| PT | 99110 A | 12/1993 |
| WO | WO 8202303 A1 | 7/1982 |
| WO | WO 8908967 A1 | 9/1989 |
| WO | WO 90/13972 A1 | 11/1990 |
| WO | WO 93/22877 A2 | 11/1993 |
| WO | WO 9416534 A2 | 7/1994 |
| WO | WO 9419910 A1 | 9/1994 |
| WO | WO 9421079 A1 | 9/1994 |
| WO | WO 95/15658 A1 | 6/1995 |
| WO | WO 9532587 A1 | 11/1995 |
| WO | WO 9533342 A1 | 12/1995 |
| WO | WO 9614712 A1 | 5/1996 |
| WO | WO 9627843 A1 | 9/1996 |
| WO | WO 9631826 A1 | 10/1996 |
| WO | WO 9637074 A2 | 11/1996 |
| WO | WO 9642168 A1 | 12/1996 |
| WO | WO 9716925 A1 | 5/1997 |
| WO | WO 9733434 A1 | 9/1997 |
| WO | WO 9739583 A1 | 10/1997 |
| WO | WO 9826595 A1 | 6/1998 |
| WO | WO 99/00735 A1 | 1/1999 |
| WO | WO 99/04568 | 1/1999 |
| WO | WO 9900735 A1 | 1/1999 |
| WO | WO 9930496 A1 | 6/1999 |
| WO | WO 9930497 A1 | 6/1999 |
| WO | WO 9930500 A1 | 6/1999 |
| WO | WO 9930501 A1 | 6/1999 |
| WO | WO 9935840 A1 | 7/1999 |
| WO | WO 9941911 A1 | 8/1999 |
| WO | WO 9956468 A1 | 11/1999 |
| WO | WO 99/65232 A1 | 12/1999 |
| WO | WO 99/65243 A1 | 12/1999 |
| WO | WO 9966732 A1 | 12/1999 |
| WO | WO 0002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO 01/82614 A1 | 11/2001 |
| WO | WO 01/92973 | 12/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO2004/057609 A1 | 7/2004 |
| WO | WO 2004/073310 A1 | 8/2004 |
| WO | WO 2005/002215 A1 | 1/2005 |
| WO | WO 2005/041122 A2 | 5/2005 |
| WO | WO 2005/053301 A2 | 6/2005 |
| WO | WO2005/076575 | 8/2005 |
| WO | WO 2005/120067 A2 | 12/2005 |
| WO | WO 2006/014362 A1 | 2/2006 |
| WO | WO 2006/022881 A1 | 3/2006 |
| WO | WO 2006/053305 | 5/2006 |
| WO | WO 2006/067697 A2 | 6/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO2008/044916 A1 | 4/2008 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO2009/038596 | 3/2009 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 A2 | 10/2012 |
| WO | WO 2013/106390 A1 | 7/2013 |
| WO | WO 2013/155310 A1 | 7/2013 |
| WO | WO2013/184604 A1 | 12/2013 |

OTHER PUBLICATIONS

ActiveVideo Networks Inc., International Search Report and Written Opinion, PCT/US2014/030773, Jul. 25, 2014, 8 pgs.

ActiveVideo Networks Inc., International Search Report and Written Opinion, PCT/US2014/041416, Aug. 27, 2014, 8 pgs.

ActiveVideo Networks Inc., Extended EP Search Rpt, Application No. 13168509.1, 10 pgs.

ActiveVideo Networks Inc., Extended EP Search Rpt, Application No. 13168376-5, 8 pgs.

ActiveVideo Networks Inc., Extended EP Search Rpt, Application No. 12767642-7, 12 pgs.

ActiveVideo Networks Inc., Communication Pursuant to Rules 70(2) and 70a(2), EP10841764.3, Jun. 6, 2014, 1 pg.

ActiveVideo Networks Inc., Communication Pursuant to Rules 70(2) and 70a(2), EP11833486.1, Apr. 24, 2014, 1 pg.

(56) References Cited

OTHER PUBLICATIONS

ActiveVideo Networks Inc., Communication Pursuant to Article 94(3) EPC, EP08713106.6-1908, Jun. 26, 2014, 5 pgs.
ActiveVideo Networks Inc., Communication Pursuant to Article 94(3) EPC, EP08713106.6-2223, May 10, 2011, 7 pgs.
ActiveVideo Networks Inc., Communication Pursuant to Rule 94(3), EP08713106-6, Jun. 26, 2014, 5 pgs.
ActiveVideo Networks Inc., Communication Pursuant to Article 94(3) EPC, EP09713486.0, Apr. 14, 2014, 6 pgS.
ActiveVideo Networks Inc., Examination Report No. 1, AU2011258972, Apr. 4, 2013, 5 pgs.
ActiveVideo Networks Inc., Examination Report No. 1, AU2010339376, Apr. 30, 2014, 4 pgs.
ActiveVideo Networks Inc., Examination Report, App. No. EP11749946.7, Oct. 8, 2013, 6 pgs.
ActiveVideo Networks Inc., Summons to attend oral-proceeding, Application No. EP09820936-4, Aug. 19, 2014, 4 pgs.
ActiveVideo Networks Inc., International Searching Authority, International Search Report—International application No. PCT/US2010/027724, dated Oct. 28, 2010, together with the Written Opinion of the International Searching Authority, 7 pages.
ActiveVideo Networks, Inc., International Search Report and Written Opinion, PCT/US2014/041430, Oct. 9, 2014, 9 pgs.
Active Video Networks, Notice of Reasons for Rejection, JP2012-547318, Sep. 26, 2014, 7 pgs.
Adams, Jerry, NTZ Nachrichtechnische Zeitschrift. vol. 40, No. 7, Jul. 1987, Berlin DE pp. 534-536; Jerry Adams: 'Glasfasernetz für Breitbanddienste in London', 5 pgs. No English Translation Found.
Avinity Systems B.V., Communication pursuant to Article 94(3) EPC, EP 07834561.8, Jan. 31, 2014, 10 pgs.
Avinity Systems B.V., Communication pursuant to Article 94(3) EPC, EP 07834561.8, Apr. 8, 2010, 5 pgs.
Avinity Systems B.V., International Preliminary Report on Patentability, PCT/NL2007/000245, Mar. 31, 2009, 12 pgs.
Avinity Systems B.V., International Search Report and Written Opinion, PCT/NL2007/000245, Feb. 19, 2009, 18 pgs.
Avinity Systems B.V., Notice of Grounds of Rejection for Patent, JP 2009-530298, Sep. 3, 2013, 4 pgs.
Avinity Systems B.V., Notice of Grounds of Rejection for Patent, JP 2009-530298, Sep. 25, 2012, 6 pgs.
Avinity Systems B. V., Final Office Action, JP-2009-530298, Oct. 7, 2014, 8 pgs.
Bird et al., "Customer Access to Broadband Services," ISSLS 86—The International Symposium on Subrscriber Loops and Services Sep. 29, 1986, Tokyo,JP 6 pgs.
Brockmann, Final Office Action, U.S. Appl. No. 12/443,571, Mar. 7, 2014, 21 pgs.
Brockmann, Final Office Action, U.S. Appl. No. 13/668,004, Jul. 16, 2014, 20 pgs.
Brockmann, Final Office Action, U.S. Appl. No. 13/686,548, Sep. 24, 2014, 13 pgs.
Brockmann, Final Office Action, U.S. Appl. No. 13/438,617, Oct. 3, 2014, 19 pgs.
Brockmann, Office Action, U.S. Appl. No. 13/686,548, Mar. 10, 2014, 11 pgs.
Brockmann, Office Action, U.S. Appl. No. 13/668,004, Dec. 23, 2013, 9 pgs.
Brockmann, Office Action, U.S. Appl. No. 13/438,617, May 12, 2014, 17 pgs.
Brockmann, Office Action, U.S. Appl. No. 12/443,571, Jun. 5, 2013, 18 pgs.
Brockmann, Office Action, U.S. Appl. No. 12/443,571, Nov. 5, 2014, 26 pgs.
Chang, Shih-Fu, et al., "Manipulation and Compositing of MC-DOT Compressed Video," IEEE Journal on Selected Areas of Communications, Jan. 1995, vol. 13, No. 1, 11 pgs.
Dahlby, Office Action, U.S. Appl. No. 12/651,203, Jun. 5, 2014, 18 pgs.
Dahlby, Final Office Action, U.S. Appl. No. 12/651,203, Feb. 4, 2013, 18 pgs.
Dahlby, Office Action, U.S. Appl. No. 12/651,203, Aug. 16, 2012, 18 pgs.
Dukes, Stephen D., "Photonics for cable television system design, Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan. 5, 2011, 6 pgs.
Frezza, W., "The Broadband Solution—Metropolitan CATV Networks," Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobl, et al., "ARIDEM—a multi-service broadband access demonstrator," Ericsson Review No. 3, 1996, 7 pgs.
Gordon, Notice of Allowance, U.S. Appl. No. 12/008,697, Mar. 20, 2014, 10 pgs.
Gordon, Final Office Action, U.S. Appl. No. 12/008,722, Mar. 30, 2012, 16 pgs.
Gordon, Final Office Action, U.S. Appl. No. 12/035,236, Jun. 11, 2014, 14 pgs.
Gordon, Final Office Action, U.S. Appl. No. 12/035,236, Jul. 22, 2013, 7 pgs.
Gordon, Final Office Action, U.S. Appl. No. 12/035,236, Sep. 20, 2011, 8 pgs.
Gordon, Final Office Action, U.S. Appl. No. 12/035,236, Sep. 21, 2012, 9 pgs.
Gordon, Final Office Action, U.S. Appl. No. 12/008,697, Mar. 6, 2012, 48 pgs.
Gordon, Office Action, U.S. Appl. No. 12/035,236, Mar. 13, 2013, 9 pgs.
Gordon, Office Action, U.S. Appl. No. 12/035,236, Mar. 22, 2011, 8 pgs.
Gordon, Office Action, U.S. Appl. No. 12/035,236, Mar. 28, 2012, 8 pgs.
Gordon, Office Action, U.S. Appl. No. 12/035,236, Dec. 16, 2013, 11 pgs.
Gordon, Office Action, U.S. Appl. No. 12/008,697, Aug. 1, 2013, 43 pgs.
Gordon, Office Action, U.S. Appl. No. 12/008,697, Aug. 4, 2011, 39 pgs.
Gordon, Office Action, U.S. Appl. No. 12/008,722, Oct. 11, 2011, 16 pgs.
Handley et al, "TCP Congestion Window Validation," RFC 2861, Jun. 2000, Network Working Group, 22 pgs.
Henry et al. "Multidimensional Icons" ACM Transactions on Graphics, vol. 9, No. 1 Jan. 1990, 5 pgs.
Isensee et al., "Focus Highlight for World Wide Web Frames," Nov. 1, 1997, IBM Technical Disclosure Bulletin, vol. 40, No. 11, pp. 89-90.
ICTV, Inc., International Search Report / Written Opinion, PCT/US2008/000400, Jul. 14, 2009, 10 pgs.
ICTV, Inc., International Search Report / Written Opinion, PCT/US2008/000450, Jan. 26, 2009, 9 pgs.
Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.
Koenen, Rob,"MPEG-4 Overview—Overview of the MPEG-4 Standard" Internet Citation, Mar. 2001, http://mpeg.telecomitalialab.com/standards/mpeg-4/mpeg-4.htm, May 9, 2002, 74 pgs.
Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9, 2000, 7 pgs.
Le Gall, Didier, "MPEG: A Video Compression Standard for Multimedia Applications", Communication of the ACM, vol. 34, No. 4, Apr. 1991, New York, NY, 13 pgs.
Langenberg, E, et al., "Integrating Entertainment and Voice on the Cable Network," SCTE , Conference on Emerging Technologies, Jan. 6-7, 1993, New Orleans, Louisiana, 9 pgs.
Large, D., "Tapped Fiber vs. Fiber-Reinforced Coaxial CATV Systems", IEEE LCS Magazine, Feb. 1990, 7 pgs.

(56) References Cited

OTHER PUBLICATIONS

"MSDL Specification Version 1.1" International Organisation for Standardisation Organisation Internationale EE Normalisation, ISO/IEC JTC1/SC29/WG11 Coding of Moving Pictures and Autdio, N1246, MPEG96/Mar. 1996, 101 pgs.

Noguchi, Yoshihiro, et al., "MPEG Video Compositing in the Compressed Domain," IEEE International Symposium on Circuits and Systems, vol. 2, May 1, 1996, 4 pgs.

Regis, Notice of Allowance U.S. Appl. No. 13/273,803, Sep. 2, 2014, 8 pgs.

Regis, Notice of Allowance U.S. Appl. No. 13/273,803, May 14, 2014, 8 pgs.

Regis, Final Office Action U.S. Appl. No. 13/273,803, Oct. 11, 2013, 23 pgs.

Regis, Office Action U.S. Appl. No. 13/273,803, Mar. 27, 2013, 32 pgs.

Rose, K., "Design of a Switched Broad-Band Communications Network for Interactive Services," IEEE Transactions on Communications, vol. com-23, No. 1, Jan. 1975, 7 pgs.

Saadawi, Tarek N., "Distributed Switching for Data Transmission over Two-Way CATV", IEEE Journal on Selected Areas in Communications, vol. Sac-3, No. 2, Mar. 1985, 7 pgs.

Schrock, "Proposal for a Hub Controlled Cable Television System Using Optical Fiber," IEEE Transactions on Cable Television, vol. CATV-4, No. 2, Apr. 1979, 8 pgs.

Sigmon, Notice of Allowance, U.S. Appl. No. 13/311,203, Sep. 22, 2014, 5 pgs.

Sigmon, Notice of Allowance, U.S. Appl. No. 13/311,203, Feb. 27, 2014, 14 pgs.

Sigmon, Final Office Action, U.S. Appl. No. 13/311,203, Sep. 13, 2013, 20 pgs.

Sigmon, Office Action, U.S. Appl. No. 13/311,203, May 10, 2013, 21 pgs.

Smith, Brian C., et al., "Algorithms for Manipulating Compressed Images," IEEE Computer Graphics and Applications, vol. 13, No. 5, Sep. 1, 1993, 9 pgs.

Smith, J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA, IEEE, US, May 31, 1998, 4 pgs.

Stoll, G. et al., "GMF4iTV: Neue Wege zur-Interaktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs. No English Translation Found.

Tamitani et al., "An Encoder/Decoder Chip Set for the MPEG Video Standard," 1992 IEEE International Conference on Acoustics, vol. 5, Mar. 1992, San Francisco, CA, 4 pgs.

Terry, Jack, "Alternative Technologies and Delivery Systems for Broadband ISDN Access", IEEE Communications Magazine, Aug. 1992, 7 pgs.

Tobagi, Fouad A., "Multiaccess Protocols in Packet Communication Systems," IEEE Transactions on Communications, vol. Com-28, No. 4, Apr. 1980, 21 pgs.

Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.

Jurgen_Two-way applications for cable television systems in the '70s, IEEE Spectrum, Nov. 1971, 16 pgs.

va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.

Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.

Yum, TS P., "Hierarchical Distribution of Video with Dynamic Port Allocation," IEEE Transactions on Communications, vol. 39, No. 8, Aug. 1, 1991, XP000264287, 7 pgs.

ActiveVideo Networks, Inc., International Preliminary Report on Patentablity, PCT/US2013/036182, Oct. 14, 2014, 9 pgs.

ActiveVideo Networks Inc., Communication Pursuant to Rule 94(3), EP08713106-6, Jun. 25, 2014, 5 pgs.

ActiveVideo Networks Inc., Communication Pursuant to Rules 161(2) & 162 EPC, EP13775121.0, Jan. 20, 2015, 3 pgs.

ActiveVideo Networks Inc., Examination Report No. 1, AU2011258972, Jul. 21, 2014, 3 pgs.

ActiveVideo Networks Inc., Certificate of Patent JP5675765, Jan. 9, 2015, 3 pgs.

Brockmann, Notice of Allowance, U.S. Appl. No. 13/445,104, Dec. 24, 2014, 14 pgs.

Brockmann, Office Action, U.S. Appl. No. 13/668,004, Feb. 26, 2015, 17 pgs.

Brockmann, Office Action, U.S. Appl. No. 13/686,548, Jan. 5, 2015, 12 pgs.

Brockmann, Office Action, U.S. Appl. No. 13/911,948, Dec. 26, 2014, 12 pgs.

Brockmann, Office Action, U.S. Appl. No. 13/911,948, Jan. 29, 2015, 11 pgs.

Dahlby, Office Action, U.S. Appl. No. 12/651,203, Dec. 3, 2014, 19 pgs.

Gordon, Notice of Allowance, U.S. Appl. No. 12/008,697, Dec. 8, 2014, 10 pgs.

Gordon, Office Action, U.S. Appl. No. 12/008,722, Nov. 28, 2014, 18 pgs.

Regis, Notice of Allowance, U.S. Appl. No. 13/273,803, Nov. 18, 2014, 9 pgs.

Regis, Notice of Allowance, U.S. Appl. No. 13/273,803, Mar. 2, 2015, 8 pgs.

Sigmon, Notice of Allowance, U.S. Appl. No. 13/311,203, Dec. 19, 2014, 5 pgs.

TAG Networks Inc, Decision to Grant a Patent, JP 2008-506474, Oct. 4, 2013, 5 pgs.

ActiveVideo Networks Inc., Decision to refuse a European patent application (Art. 97(2) EPC, EP09820936.4, Feb. 20, 2015, 4 pgs.

ActiveVideo Networks Inc., Communication Pursuant to Article 94(3) EPC, 10754084.1, Feb. 10, 2015, 12 pgs.

ActiveVideo Networks Inc., Communication under Rule 71(3) EPC, Intention to Grant, EP08713106.6, Feb. 19, 2015, 12 pgs.

ActiveVideo Networks Inc., Notice of Reasons for Rejection, JP2014-100460, Jan. 15, 2015, 6 pgs.

ActiveVideo Networks Inc., Notice of Reasons for Rejection, JP2013-509016, Dec. 24, 2014 (Received Jan. 14, 2015), 11 pgs.

Brockmann, Office Action, U.S. Appl. No. 13/737,097, Mar. 16, 2015, 18 pgs.

Brockmann, Notice of Allowance, U.S. Appl. No. 14/298,796, Mar. 18, 2015, 11 pgs.

Craig, Decision on Appeal—Reversed-, U.S. Appl. No. 11/178,177, Feb. 25, 2015, 7 pgs.

Craig, Notice of Allowance, U.S. Appl. No. 11/178,177, Mar. 5, 2015, 7 pgs.

Craig, Notice of Allowance, U.S. Appl. No. 11/178,181, Feb. 13, 2015, 8 pgs.

AC-3 digital audio compression standard, Extract, Dec. 20, 1995, 11 pgs.

ActiveVideo Networks BV, International Preliminary Report on Patentability, PCT/NL2011/050308, Sep. 6, 2011, 8 pgs.

ActiveVideo Networks BV, International Search Report and Written Opinion, PCT/NL2011/050308, Sep. 6, 2011, 8 pgs.

Activevideo Networks Inc., International Preliminary Report on Patentability, PCT/US2011/056355, Apr. 16, 2013, 4 pgs.

ActiveVideo Networks Inc., International Preliminary Report on Patentability, PCT/US2012/032010, Oct. 8, 2013, 4 pgs.

ActiveVideo Networks Inc., International Search Report and Written Opinion, PCT/US2011/056355, Apr. 13, 2012, 6 pgs.

ActiveVideo Networks Inc., International Search Report and Written Opinion, PCT/US2012/032010, Oct. 10, 2012, 6 pgs.

ActiveVideo Networks Inc., International Search Report and Written Opinion, PCT/US2013/020769, May, 9, 2013, 9 pgs.

(56) References Cited

OTHER PUBLICATIONS

ActiveVideo Networks Inc., International Search Report and Written Opinion, PCT/US2013/036182, Jul. 29, 2013, 12 pgs.
ActiveVideo Networks, Inc., International Search Report and Written Opinion, PCT/US2009/032457, Jul. 22, 2009, 7 pgs.
ActiveVideo Networks Inc., Extended EP Search Rpt, Application No. 09820936-4, 11 pgs.
ActiveVideo Networks Inc., Extended EP Search Rpt, Application No. 10754084-1, 11 pgs.
ActiveVideo Networks Inc., Extended EP Search Rpt, Application No. 10841764.3, 16 pgs.
ActiveVideo Networks Inc., Extended EP Search Rpt, Application No. 11833486.1, 6 pgs.
AcitveVideo Networks Inc., Korean Intellectual Property Office, International Search Report; PCT/US2009/032457, Jul. 22, 2009, 7 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, 10 pgs.
Avinity Systems B.V., Extended European Search Report, Application No. 12163712-8, 10 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, Dec. 23, 2010, 8 pgs.
Craig, Notice of Allowance, U.S. Appl. No. 11/178,183, Jan. 12, 2012, 7 pgs.
Craig, Notice of Allowance, U.S. Appl. No. 11/178,183, Jul. 19, 2012, 8 pgs.
Craig, Notice of Allowance, U.S. Appl. No. 11/178,189, Oct. 12, 2011, 7 pgs.
Craig, Notice of Allowance, U.S. Appl. No. 11/178,176, Mar. 23, 2011, 8 pgs.
Craig, Notice of Allowance, U.S. Appl. No. 13/609,183, Aug. 26, 2013, 8 pgs.
Craig, Final Office Action, U.S. Appl. No. 11/103,838, Feb. 5, 2009, 30 pgs.
Craig, Final Office Action, U.S. Appl. No. 11/178,181, Aug. 25, 2010, 17 pgs.
Craig, Final Office Action, U.S. Appl. No. 11/103,838, Jul. 6, 2010, 35 pgs.
Craig, Final Office Action, U.S. Appl. No. 11/178,176, Oct. 1, 2010, 8 pgs.
Craig, Final Office Action, U.S. Appl. No. 11/178,183, Apr. 13, 2011, 16 pgs.
Craig, Final Office Action, U.S. Appl. No. 11/178,177, Oct. 26, 2010, 12 pgs.
Craig, Final Office Action, U.S. Appl. No. 11/178,181, Jun. 20, 2011, 21 pgs.
Craig, Office Action, U.S. Appl. No. 11/103,838, May 12, 2009, 32 pgs.
Craig, Office Action, U.S. Appl. No. 11/103,838, Aug. 19, 2008, 17 pgs.
Craig, Office Action, U.S. Appl. No. 11/103,838, Nov. 19, 2009, 34 pgs.
Craig, Office Action, U.S. Appl. No. 11/178,176, May 6, 2010, 7 pgs.
Craig, Office-Action U.S. Appl. No. 11/178,177, Mar. 29, 2011, 15 pgs.
Craig, Office Action, U.S. Appl. No. 11/178,177, Aug. 3, 2011, 26 pgs.
Craig, Office Action, U.S. Appl. No. 11/178,177, Mar. 29, 2010, 11 pgs.
Craig, Office Action, U.S. Appl. No. 11/178,181, Feb. 11, 2011, 19 pgs.
Craig, Office Action, U.S. Appl. No. 11/178,181, Mar. 29, 2010, 10 pgs.
Craig, Office Action, U.S. Appl. No. 11/178,182, Feb. 23, 2010, 15 pgs.
Craig, Office Action, U.S. Appl. No. 11/178,183, Dec. 6, 2010, 12 pgs.
Craig, Office Action, U.S. Appl. No. 11/178,183, Sep. 15, 2011, 12 pgs.
Craig, Office Action, U.S. Appl. No. 11/178,183, Feb. 19, 2010, 17 pgs.
Craig, Office Action, U.S. Appl. No. 11/178,183, Jul. 20, 2010, 13 pgs.
Craig, Office Action, U.S. Appl. No. 11/178,189, Nov. 9, 2010, 13 pgs.
Craig, Office Action, U.S. Appl. No. 11/178,189, Mar. 15, 2010, 11 pgs.
Craig, Office Action, U.S. Appl. No. 11/178,189, Jul. 23, 2009, 10 pgs.
Craig, Office Action, U.S. Appl. No. 11/178,189, May 26, 2011, 14 pgs.
Craig, Office Action, U.S. Appl. No. 13/609,183, May 9, 2013, 7 pgs.
Pavlovskaia, Office Action, JP 2011-516499, Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, May 23, 2012, 5 pgs.
Herr, Notice of Allowance, U.S. Appl. No. 12/534,016, Feb. 7, 2012, 5 pgs.
Herr, Notice of Allowance, U.S. Appl. No. 12/534,016, Sep. 28, 2011, 15 pgs.
Herr, Final Office Action, U.S. Appl. No. 11/620,593, Sep. 15, 2011, 104 pgs.
Herr, Office Action, U.S. Appl. No. 11/620,593, Mar. 19, 2010, 58 pgs.
Herr, Office Action, U.S. Appl. No. 11/620,593, Apr. 21, 2009 27 pgs.
Herr, Office Action, U.S. Appl. No. 11/620,593, Dec. 23, 2009, 58 pgs.
Herr, Office Action, U.S. Appl. No. 11/620,593, Jan. 24, 2011, 96 pgs.
Herr, Office Action, U.S. Appl. No. 11/620,593, Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, Jan. 29, 2008, 9 pgs.
ICTV, Inc., International Search Report / Written Opinion, PCT/US2006/022585, Oct. 12, 2007, 15 pgs.
ICTV, Inc., International Search Report / Written Opinion, PCT/US2008/000419, May 15, 2009, 20 pgs.
ICTV, Inc., International Search Report / Written Opinion; PCT/US2006/022533, Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007.
SAOC use cases, draft requirements and architecture, Oct. 2006, 16 pgs.

(56) References Cited

OTHER PUBLICATIONS

Sigmon, Final Office Action, U.S. Appl. No. 11/258,602, Feb. 23, 2009, 15 pgs.
Sigmon, Office Action, U.S. Appl. No. 11/258,602, Sep. 2, 2008, 12 pgs.
TAG Networks, Inc., Communication pursuant to Article 94(3) EPC, European Patent Application, 06773714.8, May 6, 2009, 3 pgs.
TAG Networks Inc, Decision to Grant a Patent, JP 209-544985, Jun. 28, 2013, 1 pg.
TAG Networks Inc., IPRP, PCT/US2006/010080, Oct. 16, 2007, 6 pgs.
TAG Networks Inc., IPRP, PCT/US2006/024194, Jan. 10, 2008, 7 pgs.
TAG Networks Inc., IPRP, PCT/US2006/024195, Apr. 1, 2009, 11 pgs.
TAG Networks Inc., IPRP, PCT/US2006/024196, Jan. 10, 2008, 6 pgs.
TAG Networks Inc., International Search Report, PCT/US2008/050221, Jun. 12, 2008, 9 pgs.
TAG Networks Inc., Office Action, CN 200680017662.3, Apr. 26, 2010, 4 pgs.
TAG Networks Inc., Office Action, EP 06739032.8, Aug. 14, 2009, 4 pgs.
TAG Networks Inc., Office Action, EP 06773714.8, May 6, 2009, 3 pgs.
TAG Networks Inc., Office Action, EP 06773714.8, Jan. 12, 2010, 4 pgs.
TAG Networks Inc., Office Action, JP 2008-506474, Oct. 1, 2012, 5 pgs.
TAG Networks Inc., Office Action, JP 2008-506474, Aug. 8, 2011, 5 pgs.
TAG Networks Inc., Office Action, JP 2008-520254, Oct. 20, 2011, 2 pgs.
TAG Networks, IPRP, PCT/US2008/050221, Jul. 7, 2009, 6 pgs.
TAG Networks, International Search Report, PCT/US2010/041133, Oct. 19, 2010, 13 pgs.
TAG Networks, Office Action, CN 200880001325.4, Jun. 22, 2011, 4 pgs.
TAG Networks, Office Action, JP 2009-544985, Feb. 25, 2013, 3 pgs.
Talley, A general framework for continuous media transmission control, Oct. 13-16, 1997, 10 pgs.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHEAD, Inc., First Examination Report, IN 1744/MUMNP/2007, Dec. 30, 2013, 6 pgs.
TVHEAD, Inc., International Search Report, PCT/US2006/010080, Jun. 20, 2006, 3 pgs.
TVHEAD, Inc., International Search Report, PCT/US2006/024194, Dec. 15, 2006, 4 pgs.
TVHEAD, Inc., International Search Report, PCT/US2006/024195, Nov. 29, 2006, 9 pgs.
TVHEAD, Inc., International Search Report, PCT/US2006/024196, Dec. 11, 2006, 4 pgs.
TVHEAD, Inc., International Search Report, PCT/US2006/024197, Nov. 28, 2006, 9 pgs.
Vernon, Dolby digital: audio coding for digital television and storage applications, Aug. 1999, 18 pgs.
Wang, A compressed domain beat detector using MP3 audio bitstream, Sep. 30-Oct. 5, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams,Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo Networks, Inc., Certificate of Grant, EP08713106.6-1908, Aug. 5, 2015, 1pgs.
ActiveVideo Networks, Inc., Decision to Grant, EP08713106.6-1908, Jul. 9, 2015, 2 pgs.
ActiveVideo Networks, Inc., Decision to Grant, JP2014100460, Jul. 24, 2015, 5 pgs.
ActiveVideo Networks Inc., Examination Report No. 2, AU2011249132, May 29, 2015, 4 pgs.
Activevideo Networks Inc., Examination Report No. 2, AU2011315950, Jun. 25, 2015, 3 pgs.
ActiveVideo, International Search Report and Written Opinion, PCT/US2015/027803, Jun. 24, 2015, 18 pgs.
ActiveVideo, International Search Report and Written Opinion, PCT/US2015/027804, Jun. 25, 2015, 10 pgs.
ActiveVideo Networks, Inc., KIPO's Notice of Preliminary Rejection, KR10-210-7019512, Jul. 15, 2015, 15 pgs.
ActiveVideo Networks, Inc., KIPO's Notice of Preliminary Rejection, KR10-2107021116, Jul. 13, 2015, 19 pgs.
ActiveVideo Networks, Inc., International Search Report and Written Opinion, PCT-US2015028072, Aug. 7, 2015, 9 pgs.
ActiveVideo Networks B.V., Office Action, IL222830, Jun. 28, 2015, 7 pgs.
ActiveVideo Networks, Inc., Office Action, JP2013534034, Jun. 16, 2015, 6 pgs.
Avinity-Systems-BV, PreTrial-Reexam-Report-JP2009530298, Apr. 24, 2015, 6 pgs.
Brockmann, Notice of Allowance, U.S. Appl. No. 13/911,948, Jul. 10, 2015, 5 pgs.
Brockmann, Notice of Allowance, U.S. Appl. No. 13/438,617, May 22, 2015, 18 pgs.
Brockmann, Notice of Allowance, U.S. Appl. No. 13/445,104, Apr. 23, 2015, 8 pgs.
Brockmann, Final Office Action, U.S. Appl. No. 12/443,571, Jul. 9, 2015, 28 pgs.
Brockmann, Notice of Allowance, U.S. Appl. No. 13/911,948, Aug. 21, 2015, 6 pgs.
Brockmann, Notice of Allowance, U.S. Appl.. No. 13/911,948, Aug. 5, 2015, 5 pgs.
Brockmann, Final Office Action, U.S. Appl. No. 13/668,004, Aug. 3, 2015, 13 pgs.
Brockmann, Final Office Action, U.S. Appl. No. 13/686,548, Aug. 12, 2015, 13 pgs.
Brockmann, Final Office Action, U.S. Appl. No. 13/737,097, Aug. 14, 2015, 17 pgs.
Brockmann, Office Action, U.S. Appl. No. 14/298,796, Sep. 11, 2015, 11 pgs.
Dahlby, Office Action U.S. Appl. No. 12/651,203, Jul. 2, 2015, 25 pgs.
Gecsei, J., "Adaptation in Distributed Multimedia Systems," IEEE Multimedia, IEEE Service Center, New York, NY, vol. 4, No. 2, Apr. 1, 1997, 10 pgs.
Gordon, Notice of Allowance, U.S. Appl. No. 12/008,697, Apr. 1, 2015, 10 pgs.
Gordon, Final Office Action, U.S. Appl. No. 12/008,722, Jul. 2, 2015, 20 pgs.
Ohta, K., et al., "Selective Multimedia Access Protocol for Wireless Multimedia Communication," Communications, Computers and Signal Processing, 1997, IEEE Pacific Rim Conference NCE Victoria, BC, Canada, Aug. 1997, vol. 1, 4 pgs.
Sigmon, Notice of Allowance, U.S. Appl. No. 13/311,203, Apr. 14, 2015, 5 pgs.
Wei, S., "QoS Tradeoffs Using an Application-Oriented Transport Protocol (AOTP) for Multimedia Applications Over IP," Sep. 23-26 1999, Proceedings of the Third International Conference on Computational Intelligence and Multimedia Applications, New Delhi, India, 5 pgs.
ActiveVideo Networks, Inc., Certificate of Grant, AU2011258972, Nov. 19, 2015, 2 pgs.

(56) References Cited

OTHER PUBLICATIONS

ActiveVideo Networks, Inc., Certificate of Grant EP13168509.11908, Sep. 30, 2015, 2 pgs.
ActiveVideo Networks, Inc., Communication Pursuant to Rules 161(1) and 162 EPC, EP14722897.7, Oct. 28, 2015, 2 pgs.
ActiveVideo Networks, Inc., Decision to Grant, EP13168509.1-1908, Sep. 3, 2015, 2 pgs.
ActiveVideo Networks, Inc., Decision to Refuse a European Patent Application, EP08705578.6, Nov. 26, 2015, 10 pgs.
ActiveVideo Networks, Inc., Extended European Search Report, EP13735906.3, Nov. 11, 2015, 10 pgs.
ActiveVideo Networks, Inc., International Preliminary Report on Patentability, PCT-US2014030773, Sep. 15, 2015, 6 pgs.
ActiveVideo, Communication Pursuant to Article-94(3) EPC, EP12767642.7, Sep. 4, 2015, 4 pgs.
Brockmann, Office Action, U.S. Appl. No. 12/443,571, Dec. 4, 2015, 30 pgs.
Dahlby, Final Office Action, U.S. Appl. No. 12/651,203, Dec. 11, 2015, 25 pgs.
Jacob, Bruce, "Memory Systems: Cache, DRAM, Disk," The Cache Layer, Chapter 22, p. 739.
ActiveVideo, Certificate of Grant, AU2011249132, Jan. 7, 2016, 2 pgs.
ActiveVideo Networks, Inc., Certificate of Grant, AU2011315950, Dec. 17, 2015, 2 pgs.
ActiveVideo Networks, Inc., Certificate of Patent, JP2013534034, Jan. 8, 2016, 4 pgs.
ActiveVideo Networks, Inc., Communication Pursuant to Rules 161(1) and 162 EPC, EP14740004.8, Jan. 26, 2016, 2 pgs.
ActiveVideo Networks, Inc., Communication Pursuant to Rules 161(1) and 162 EPC, EP14736535.7, Jan. 26, 2016, 2 pgs.
ActiveVideo Networks, Inc., Communication Pursuant to Rules 70(2) abd 70a(2) EP13735906.3, Nov. 27, 2015, 1 pg.
ActiveVideo, Notice of Reasons for Rejection, JP2013-509016, Dec. 3, 2015, 7 pgs.
AcriveVideo, Communication Pursuant to Article 94(3) EPC, EP10841764.3, Dec. 18, 2015, 6 pgs.
ActiveVideo Networks, Inc., International Preliminary Report on Patentability, PCT/US2014041430, Dec. 8, 2015, 6 pgs.
ActiveVideo Networks, Inc., International Preliminary Report on Patentability, PCT-US2014041416, Dec. 8, 2015, 6 pgs.

* cited by examiner

SYSTEM AND METHOD FOR EXPLOITING SCENE GRAPH INFORMATION IN CONSTRUCTION OF AN ENCODED VIDEO SEQUENCE

RELATED APPLICATIONS

This application is a continuation-in-part of U.S. patent application Ser. No. 13/911,948, filed Jun. 6, 2013. This prior application is incorporated by reference herein in its entirety.

TECHNICAL FIELD

The present invention relates to the creation of an encoded video sequence, and more particularly to using scene graph information for encoding the video sequence.

BACKGROUND ART

It is known in the prior art to encode and transmit multimedia content for distribution within a network. For example, video content may be encoded as MPEG video wherein pixel domain data is converted into a frequency domain representation, quantized and entropy encoded and placed into an MPEG stream format. The MPEG stream can then be transmitted to a client device and decoded and returned to the spatial/pixel domain for display on a display device.

The encoding of the video may be spatial, temporal or a combination of both. Spatial encoding generally refers to the process of intra-frame encoding wherein spatial redundancy (information) is exploited to reduce the number of bits that represent a spatial location. Spatial data is converted into a frequency domain over a small region. In general for small regions it is expected that the data will not drastically change and therefore there much of the information will be stored at DC and low frequency components with the higher frequency components being at or near zero. Thus, the lack of high frequency information of small area is used to reduce the representative data size. Data may also be compressed using temporal redundancy. One method for exploiting temporal redundancy is through the calculation of motion vectors. Motion vectors establish how objects or pixels move between frames of video. Thus, a ball may move between a first frame and a second frame by a number of pixels in a given direction. Thus, once a motion vector is calculated, the information about the spatial relocation of the ball information from the first frame to the second frame can be used to reduce the amount of information that is used to represent the motion in an encoded video sequence. Note that in practical applications the motion vector is rarely a perfect match and an additional residual is sometimes used to compensate for the imperfect temporal reference.

Motion vector calculation is a time consuming and processor intensive step in compressing video content. Typically, a motion search algorithm is employed to attempt to match elements within the video frames and to define motion vectors that point to the new location that objects or portions of objects. This motion search algorithm compares macroblocks (i.e., tries to find for each macroblock the optimal representation of that macroblock in past and future reference frames to a certain criterion), and determines the vector to represent that temporal relation. The motion vector is subsequently used (i.e., to minimize the residual that needs to be compressed) in the compression process. It would be beneficial if a mechanism existed that assists in the determination of these motion vectors.

As appreciated by those skilled in the art, another expensive component of the encoding process for more advanced codecs is the process to find the optimal macroblock type, partitioning of the macroblock and the weighing properties of the slice. H.264, for example, has 4 16×16, 9 8×8 and 9 4×4 luma intra prediction modes, 4 8×8 chroma intra prediction modes and inter macroblocks can be partitioned from as coarse as 16×16 to as fine grained as 4×4. In addition to that, it is possible to assign a weight and offset to the temporal references. A mechanism that defines or assists in finding these parameters directly improves scalability.

SUMMARY OF THE EMBODIMENTS

In a first embodiment of the invention there is provided a method for creating a composited video frame sequence for an application wherein the video frame sequence is encoded according to a predetermined specification, such as MPEG-2, H.264 or other block based encoding protocol or variant thereof. A current scene state for the application is compared to a previous scene state wherein each scene state includes a plurality of objects. A video construction module determines if properties of one or more objects have changed (such as, but not limited to, the object's position, transformation matrix, texture, translucency, etc. . . . ) based upon a comparison of the scene states. If properties of one or more objects have changed, the delta between the object's states is determined and this is used by a fragment encoding module in case the fragment is not already available in a fragment caching module. This information is used to define, for example, the motion vectors used by the fragment encoding module in the construction of the fragments for the stitching module to build the composited video frame sequence from.

In certain embodiments of the invention, the information about the changes in the scene's state can also be used to decide whether a macroblock is to be encoded spatially (using an intra encoded macroblock) or temporally (using an inter encoded macroblock) and given a certain encoding, what the optimal partitioning of the macroblock is. In certain embodiments, the information about the changes in the scene's state may also assist in finding the optimal weight and offset of the temporal reference in order to minimize the residual. The benefits of using scene state information in the encoding process is a gain in efficiency with respect to the resources required to encode the fragments, as well as improvements in the visual quality of the encoded fragments or to minimize the size of the encoded fragments because spatial relations in the current scene state or temporal relations between the previous scene state and current scene state can be more accurately determined.

Some embodiments of the invention may maintain objects in a 2 dimensional coordinate system, 2 dimensional (flat) objects in a 3 dimensional coordinate system or a full 3 dimensional object model in a 3 dimensional coordinate system. The objects may be kept in a hierarchical structure, such as a scene graph. Embodiments may use additional 3 dimensional object or scene properties known to the trade, such as, but not limited to, perspective, lighting effects, reflection, refraction, fog, etc.

In other embodiments, in order to determine the motion information, the current scene graph state and the previous scene graph state may be converted from a three dimensional representation into a two dimensional representation. The three dimensional representation may be for a worldview of the objects to be rendered and displayed on a display device. The two dimensional representation may be a screen view for displaying the objects on a display device. In addition to the motion information, in general there will be residual graphical information because the edges of moving objects generally do not map exactly on macroblock boundaries or objects are partially translucent, overlay or have quantization effects etc.

Embodiments of the invention may construct an MPEG encoded video sequence using the motion information including the corresponding motion vectors and residual graphical information that can be encoded. The scene states (previous and current) may result as the output of an application engine such as an application execution engine. The application execution engine may be a web browser, a script interpreter, operating system or other computer-based environment that is accessed during operation of the application. The application execution engine may interface with the described system using a standardized API (application programming interface), such as for example OpenGL. The system may translate the scene representation as expressed through the used API to a convenient internal representation or directly derive state changes from the API's primitives.

The current scene graph state includes a plurality objects having associated parameters. Some examples of parameters are the location of objects to be rendered, lighting effects, textures, and other graphical characteristics that may be used in rendering the object(s). A hash may be created for objects within a scene. The hash may be compared to a table of hashes that represent objects from previous scenes. If the current hash matches a hash within the table of hashes, MPEG encoded elements for the identified object are retrieved. The MPEG encoded elements can then be sent to a stitcher that can stitch together the MPEG encoded elements to form one or more MPEG encoded video frames in a series of MPEG encoded video frames.

In order to create the hash for the objects, the scene graph state is converted to a 2D or display representation. It is then determined which non-overlapping rectangles of the display represent state changes of the scene graph state. A hash is created for each rectangle, i.e. object; the previous and current state of the objects within these rectangles is hashed. These hashes are compared to hashes available in the table of hashes.

If the current hash does not match a hash in the table and no motion information can be determined by the scene graph state comparison for an object, the spatial data from the hashing process where the object is converted from a three dimensional representation to a two dimension screen representation is provided to an encoder wherein the encoder compresses the data using at least spatial techniques to produce one or more encoded elements. The encoder may encode according to a predetermined protocol such as MPEG, H.264 or another block based encoding protocol. The encoded elements are passed to a stitching module. The stitching module forms an encoded MPEG frame from the encoded elements where the encoded MPEG frame is part of an MPEG video sequence.

The methodology may be embodied as a computer program product where the computer program product includes a non-transitory computer readable medium having computer code thereon for creating an encoded video sequence. The above-described method may be embodied as a system that includes one or more processors that perform specified functions in the creation of the encoded video sequence.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
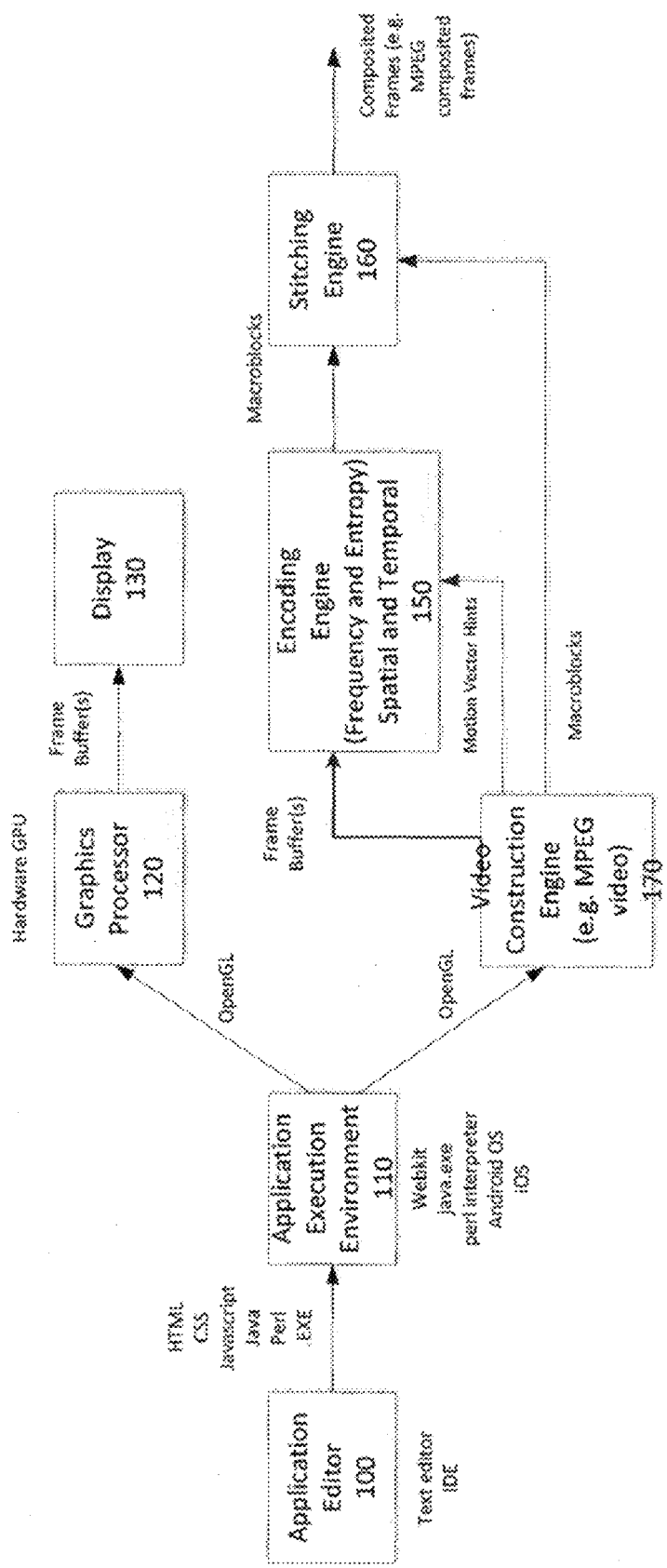
FIG. 1 shows a detailed embodiment showing components that are used in processing application environment data and constructing an encoded video sequence from the data.

Definitions. As used in this description and the accompanying claims, the following terms shall have the meanings indicated, unless the context otherwise requires:

The term "application" refers to an executable program, or a listing of instructions for execution, that defines a graphical user interface ("GUI") for display on a display device. An application may be written in a declarative language such as HTML or CSS, a procedural language such as C, JavaScript, or Perl, any other computer programming language, or a combination of languages.

"Application execution environment" is an environment that receives in an application including all of its components and manages the components and execution of the components to define a graphical layout and manages the interactions with the graphical layout. For example, Trident, WebKit, and Gecko are software layout engines that convert web pages into a collection of graphical objects (text strings, images, and so on) arranged, according to various instructions, within a page display area of a web browser. The instructions may be static, as in the case of parts of HTML, or dynamic, as in the case of JavaScript or other scripting languages, and the instructions may change as a function of user input. Trident is developed by Microsoft Corporation and used by the Internet Explorer web browser; WebKit is developed by a consortium including Apple, Nokia, Google and others, and is used by the Google Chrome and Apple Safari web browsers; Gecko is developed by the Mozilla Foundation, and is used by the Firefox web browser. Operating systems such as Google's Android and Apple's iOS may be considered application execution environment because these operating systems can execute applications. The output of an application execution environment is a screen state (either absolute or relative to a previous screen state). The screen state may be presented as a scene graph state.

"Rendering Engine" transforms a model of an image to actual data that can generate the image on a display device. The model of the image may contain two-dimensional or three-dimensional data as would be represented in a world space and the rendering engine takes the data and transforms the data into a screen-space representation wherein the data may be represented as pixels.

"Video Construction Module" compares scene states and derives which areas on the display device need to be changed. The video construction module determines how to map the changed areas to encoded fragments that can be stitched together and maintains a cache of already encoded fragments. If fragments are not available in an encoded form, the video construction module interacts with an fragment encoding module to encode the fragment.

"Fragment Caching Module" stores fragments in volatile memory (such as for example the system's RAM) or persistent memory (such as for example a disc based file system).

"Encoding Engine/Fragment Encoding Module" transforms graphical data and associated information about spatial and/or temporal relations into one or more encoded fragments.

"Stitching Engine/Module" receives as input one or more fragments (e.g., MPEG encoded elements) along with layout information and then constructs complete video frames for a video sequence (e.g. MPEG video frames for an MPEG elementary stream).

"Scene" is a model of an image generated by an application execution engine consisting of objects and their properties;

"Scene state" is the combined state of all objects and their properties at a particular moment in time.

"Scene Graph" is a specialized scene where objects have a hierarchical relation.

"Scene Graph State" is the combined state of all objects and their properties of a scene graph at a particular moment in time.

"API" (application programming interface) is an interaction point for software modules, providing functions, data structures and object classes with the purpose of using provided services in software modules.

"DOM" (document object model) is a convention for representing and interacting with objects in markup languages such as HTML and XML documents.

"DOM tree" is a representation of a DOM (document object model) for a document (e.g. an HTML file) having nodes wherein the topmost node is the document object.

"CSS" (cascading style sheets) provide the graphical layout information for a document (e.g. an HTML document) and how each object or class of objects should be represented graphically. The combination of a DOM object and the corresponding CSS files (i.e. layout) is referred to as a rendering object.

"Render layer" is a graphical representation of one or more objects of a scene graph state. For example, a group of objects that have a geographical relationship such as an absolute or a relative position to each other may form a layer. An object may be considered to be a separate render layer if, for example, the object is transparent, has an alpha mask or has a reflection. A render layer may be defined by a screen area, such as a screen area that can be scrolled. A render layer may be designated for an area that may have an overlay (e.g. a pop up). A render layer may be defined for a portion of a screen area if that area is to have an applied graphical filter such as a blur, color manipulation or shadowing. A layer may be defined by a screen area that has associated video content. Thus, a render layer may be a layer within a scene graph state or a modification of a scene graph state layer in which objects are grouped according to a common characteristic.

"Fragment" is one or more MPEG-encoded macroblocks, as disclosed in U.S. patent application Ser. No. 12/443,571, filed Oct. 1, 2007, the contents of which are incorporated by reference in their entirety. A fragment may be intra-encoded (spatially-encoded), inter-encoded (temporally-encoded) or a combination thereof.

Embodiments of the present invention provide for the extraction of spatial information as well as other graphical information from an application execution environment by using software integration points that are (for example) intended for communication between the application execution environment and Graphical Processing Unit (GPU) driver software. This spatial information can then be used for the creation of motion vectors for encoding of graphical content in a frequency-based encoding format, such as MPEG, AVS, VC-1, H.264 and other block-based encoding formats and variants that employ motion vectors.

Embodiments of the invention use the motion information exposed by an Application Execution Environment's GPU interface (or another suitable interface that allows access to the scene graph state) to obtain spatial and temporal information of the screen objects to be rendered, and to use that information to more efficiently encode the screen objects into a stream of MPEG frames.

In order to determine the motion information, the application execution Environment may access Z-ordering information from a scene graph for the rendering of objects. For example, the application execution environment can separate a background layer from a foreground image layer and the scene graph state may specify objects that are partially translucent. This information can be used to determine what information will be rendered from a 3-dimensional world view in a 2-dimensional screen view. Once the visible elements are determined, motion information can be determined and the motion information can be converted into motion vectors. Multiple motion vectors may be present for a particular screen area. For example, if two different layers (on different Z indices) are moving in different directions, the area would have different associated motion vectors. The encoder will determine a dominant vector given its knowledge on what is being rendered, including translucency, surface area of the moving object, texture properties (i.e. is it a solid or a pattern) etc.

FIG. 1 shows a detailed embodiment showing components that are used in processing application environment data and constructing an encoded video sequence from the data. The application environment data provides information about visual content to be rendered on a display device of a client. The data from an application execution environment 110 may be processed through one of a plurality of possible paths. The first path is a prior art path wherein the data from the application execution environment 110, which may be OpenGL library function calls is passed to a hardware-based graphics accelerator 120 and presented on a display 130. In an alternative path, the data from the application execution environment 110 is passed to a video construction engine 170. The video construction engine 170 exploits information within the data from the application execution engine to improve the encoding process and reduce the number of calculations that need to be performed. This path will be explained in greater detail below with respect to embodiments of the invention.

FIG. 1 is now explained in more detail. An application is constructed in an application editor 100. The application editor 100 may be an integrated development environment (IDE) or a text editor for example. The output of the application editor may include one or more sections. The application may be composed of one or more of the following: HTML (hypertext markup language) data, CSS (cascading style sheets) data, script(s) from various scripting languages such as Java- Script and Perl, program code, such as, JAVA for execution in an application execution environment and/or executable programs (*.exe). The components of the application may then be executed in an application execution environment 110 in response to a request for the application by a client device operating remotely from the application execution environment. An application execution environment receives in the application including its various components and creates an output file that can be used for display on a display device of the client. For example, the application execution environment may create a program referencing a number of OpenGL library functions/objects. OpenGL is a specification that describes an abstract API for drawing 2D and 3D graphics and is known to one of ordinary skill in the art.

As shown, the Application Execution Engine 110 may produce an output for graphical processing. Examples of application execution environments include both computer software and hardware and combinations thereof for executing the application. Applications can be written for certain application execution environments including WebKit, JAVA compilers, script interpreters (Perl etc.) and various operating systems including iOS and Android OS for example.

The video construction engine 170 takes advantage of the data that it receives from the application execution environment in order to exploit redundancies in requests for the presentation of information within user sessions and between user sessions as well as determining motion changes of objects from a previous video frame or scene graph state to a current frame or scene graph state. The present system may be used in a networked environment wherein multiple user sessions are operational simultaneously wherein requested applications may be used by multiple users simultaneously.

The video construction engine 170 may receive in OpenGL data and can construct a scene graph from the OpenGL data. The video construction engine 170 can then compare the current scene graph state to one or more previous scene graph states to determine if motion occurs between objects within the scene. If motion occurs between the objects, this motion can be translated into a motion vector and this motion vector information can be passed to an encoding module 150. Thus, the encoding module 150 need not perform a motion vector search and can add the motion vectors into the video frame format (e.g. MPEG video frame format). The MPEG elements can be constructed that are encoded MPEG macroblocks that are inter-frame encoded. These macroblocks are passed to the stitching module 160 that receives stitching information about the video frame layout and stitches together encoded MPEG elements to form complete MPEG encoded video frames in accordance with the scene graph. Either simultaneously or in sequence, the MPEG video construction engine may hash the parameters for objects within the scene graph according to a known algorithm. The construction engine 170 will compare the hash value to hash values of objects from previous scene graphs and if there is a match within the table of hashes, the construction engine 170 will locate MPEG encoded macroblocks (MPEG elements) that are stored in memory and are related to the hash. These MPEG elements can be passed directly to the stitching engine 160 wherein the MPEG elements are stitched together to form complete MPEG encoded video frames. Thus, the output of the stitching module 160 is a sequence of encoded video frames that contain both intra-frame encoded macroblocks and inter-frame encoded macroblocks. Additionally, the video construction engine 170 outputs pixel based information to the encoder. This pixel-based information may be encoded using spatial based encoding algorithms including the standard MPEG DCT processes. This pixel based information occurs as a result of changes in the scene (visual display) in which objects represented by rectangles are altered. The encoded macroblocks can then be passed to the stitcher. The processes of the video construction engine 170 will be explained in further detail with respect to the remaining figures.

Figure 2:
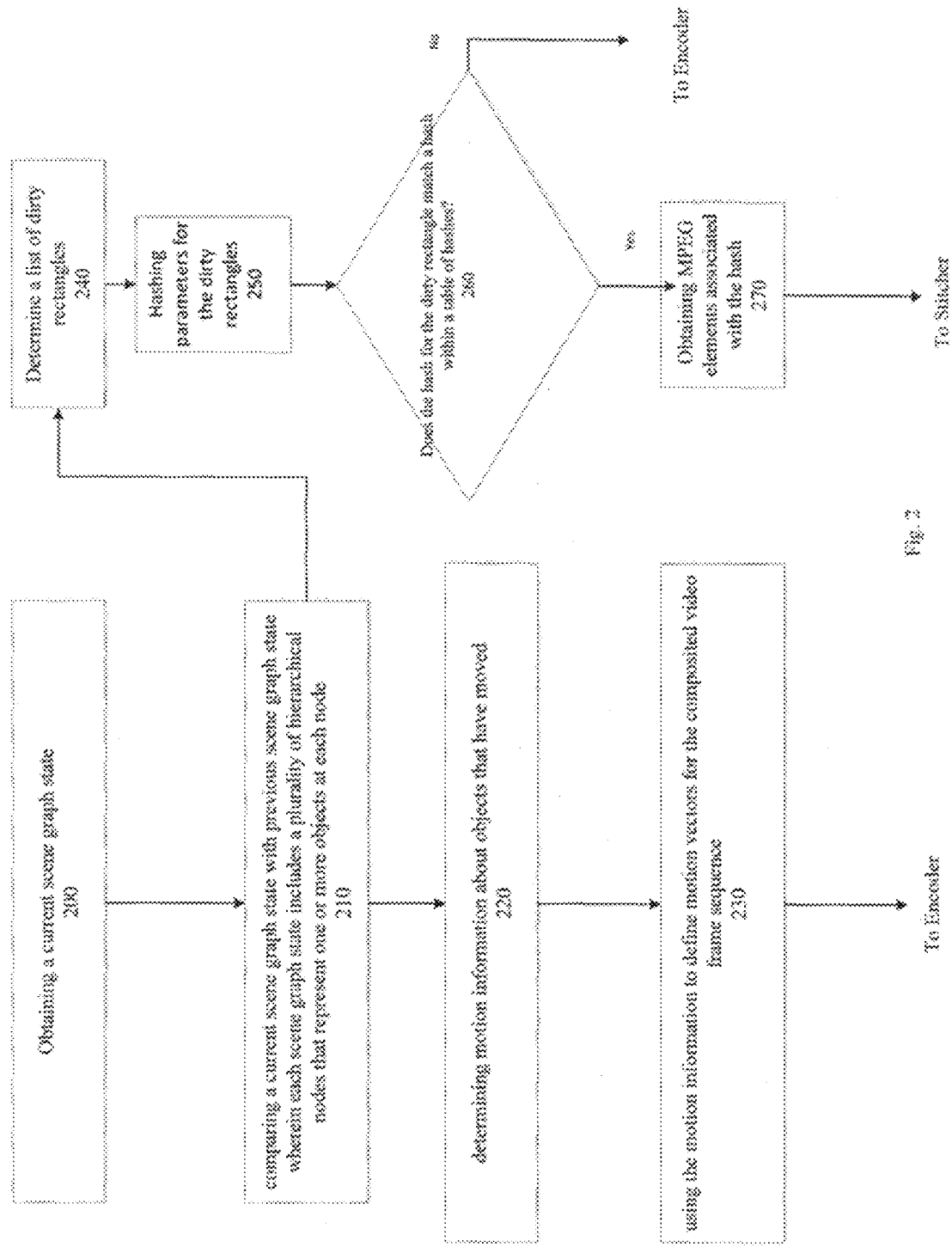
FIG. 2 shows a flow chart for implementing the functionality of relevant components of an embodiment of the invention.

FIG. 2 shows a flow chart for implementing the functionality of relevant components of an embodiment of the invention. A user of the system at a client device interacts with the application through the application execution engine. The user makes a request for content through a key press or other input that generates a control signal that is transmitted from the client device to the application execution engine that indicates that there should be a screen update of one or more screen elements (e.g. rectangles). Thus, the rectangles to be updated can be defined as a dirty rectangle that will need either to be retrieved from memory if the dirty rectangle has previously been rendered and encoded or provided to an encoder. The encoder may receive motion vector information, which will avoid motion vector calculations and the encoder may receive spatial data for dirty rectangles, which need to be spatially encoded.

Figure 6:
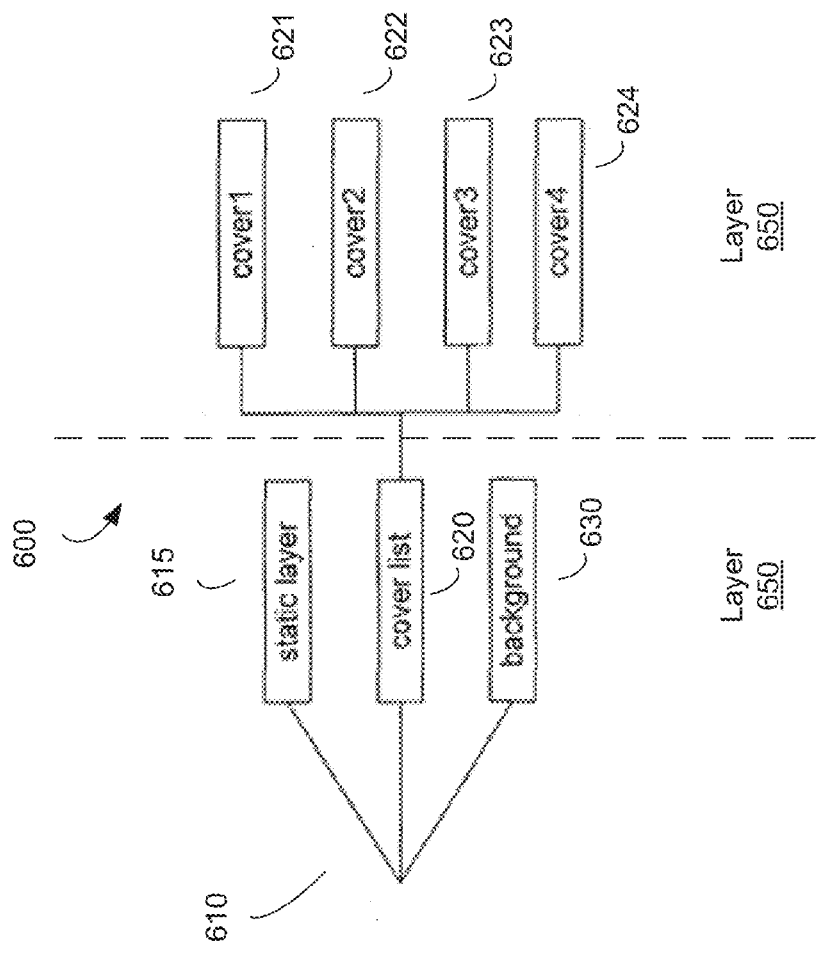
FIG. 6 shows an exemplary scene graph model of the image of FIG. 4.

The application execution engine may be proximate to the client device, operational on the client device, or may be remote from the client device, such as in a networked client/server environment. The control signal for the dirty rectangle causes the application execution engine to generate a scene graph having a scene graph state that reflects the changes to the screen (e.g. dirty rectangles of the screen display). For example, the application execution environment may be a web browser operating within an operating system. The web browser represents a page of content in a structured hierarchical format such as a DOM and corresponding DOM tree. Associated with the DOM tree is a CSS that specifies where and how each object is to be graphically rendered on a display device. The web browser creates an output that can be used by a graphics engine. The output that is produced is the scene graph state which may have one or more nodes and objects associated with the nodes forming a layer (i.e. a render layer) 200. As requests occur from a client device for updates or updates are automatically generated as in a script, a new or current scene graph state is generated. Thus, the current scene graph state represents a change in the anticipated output video that will be rendered on a display device. An exemplary scene graph state is shown in FIG. 6 described below.

Once the current scene graph state is received by the video construction engine 200, the scene graph state can be compared with a previous scene graph state 210. The comparison of scene graph states can be performed hierarchically by layer and by object. For each object associated with a node differences in the positions of objects from the scene graph states can be identified as well as differences in characteristics, such as translucence and lighting.

For example, in a simple embodiment, a circle may be translated by a definable distance between the current scene graph state and a previous scene graph state. The system queries whether one or more objects within the scene graph state have moved. If one or more objects have been identified as moving between scene graph states information about the motion translation are determined 220. This information may require the transformation of position data from a three dimensional world coordinate view to a two dimensional screen view so that pixel level motion (two dimensional motion vectors) can be determined. This motion information can then be passed on to an encoder in the form of a motion vector 230. Thus, the motion vector information can be used by the encoder which to create inter-frame encoded video frames. For example, the video frames may be P or B frame MPEG encoded frames.

In addition to objects moving, scene elements may also change. Thus, a two dimensional representation of information to be displayed on a screen can be ascertained from the three-dimensional scene graph state data. Rectangles can be defined as dirty rectangles, which identify data on the screen that has changed 240. These rectangles can by hashed according to a known formula that will take into account properties of the rectangles 250. The hash value can then be compared to a listing of hash values associated with rectangles that were updated from previous scene graph states 260. The list of hash values may be for the current user session or for other user sessions. Thus, if a request for a change in the content being displayed in an application is received from multiple parties, the redundancy in information being requested can be exploited and processing resources conserved. More specifically, if the hash matches a hash within the searchable memory, encoded graphical data (e.g. either a portion of an entire video frame of encoded data or an entire frame of encoded data) that is linked to the hash value in the searchable memory is retrieved and the data can be combined with other encoded video frames 270.

Additionally, if a rectangle is identified as being dirty and a hash is not identified, the spatial information for that rectangle can be passed to the encoder and the MPEG encoder will spatially encode the data for the rectangle. As used herein, the term content, may refer to a dirty rectangle or an object from a scene graph state.

Figure 3:
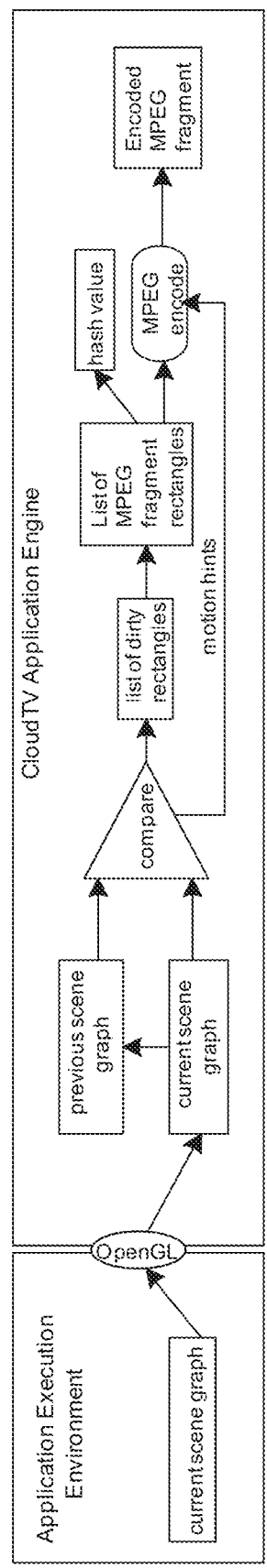
FIG. 3 shows an environment for implementing the present invention.

FIG. 3 shows an embodiment of the present invention showing the data flow between an application execution environment 300 and the data flow internal to the video construction engine 310. As previously indicated an application execution environment 300 receives as input an application and the application execution environment 300 executes the application and receives as input user requests for changes to the graphical content that is displayed on a display device associated with the user.

The application execution environment 300 creates a current scene graph 320. The current scene graph may be translated using a library of functions, such as the OpenGL library 330. The resulting OpenGL scene graph state 340 is passed to the video construction engine 310. The OpenGL scene graph state 340 for the current scene graph is compared to a previous scene graph state 350 in a comparison module 360. This may require the calculation and analysis of two-dimensional projections of three-dimension information that are present within the scene graph state. Such transformations are known by one of ordinary skill in the art. It should be recognized that OpenGL is used herein for convenience and that only the creation of a scene graph state is essential for the present invention. Thus, the scene graph state need not be converted into OpenGL before a scene graph state comparison is performed.

Differences between the scene graphs are noted and dirty rectangles can be identified 370. A dirty rectangle 370 represents a change to an identifiable portion of the display (e.g. a button changing from an on-state to an off-state). There may be more than one dirty rectangle that is identified in the comparison of the scene graph states. Thus, multiple objects within a scene may change simultaneously causing the identification of more than one dirty rectangle.

From the list of dirty rectangles 370, a list of MPEG fragment rectangles (i.e. spatially defined fragments, such as a plurality of macroblocks on macroblock boundaries) can be determined for the dirty rectangle. It should be recognized that the term MPEG fragment rectangle as used in the present context refers to spatial data and not frequency transformed data and is referred to as an MPEG fragment rectangle because MPEG requires a block-based formatting schema i.e. macroblocks that are generally 16×16 pixels in shape. Defining dirty rectangles as MPEG fragment rectangles can be achieved by defining an MPEG fragment rectangle for a dirty rectangle wherein the dirty rectangle is fully encompassed within a selection of macroblocks. Thus, the dirty rectangle fits within a rectangle composed of spatially defined macroblocks. Preferably the dirty rectangles are combined or split to limit the number of MPEG fragment rectangles that are present or to avoid small changes in large rectangles.

For each MPEG fragment rectangle, a listing of nodes according to z-order (depth) in the scene graph that contributed to the rectangle contents is determined. This can be achieved by omitting nodes that are invisible, have a low opacity, or have a transparent texture.

For each MPEG fragment rectangle, a hash value 382 is created based upon relevant properties of all nodes that have contributed to the rectangle contents (for example absolute position, width, height, transformation matrix, hash of texture bitmap, opacity). If the cache contains an encoded MPEG fragment associated with that hash value, then the encoded MPEG fragment is retrieved from the cache. In the present context, the term encoded MPEG fragment, refers to a portion of a full frame of video that has been encoded according to the MPEG standard. The encoding may simply be DCT encoding for blocks of data or may also include MPEG specific header information for the encoded material. If the calculated hash value does not match an MPEG fragment in the cache, then the dirty rectangle contents (using the scene graph state) are rendered from a three dimensional world view to a two dimensional screen view and the rendered pixel data (i.e. spatial data) are encoded in an encoder, such as an MPEG encoder 385. The encoded MPEG data (e.g. encoded MPEG fragment(s)) for the scene is stored into the cache.

As part of the encoding process, the fragment is analyzed to determine whether the encoding can best be performed as 'inter' encoding (an encoding relative to the previous screen state) or whether it is encoded as 'intra' encoding (an independent encoding). Inter-encoding is preferred in general because it results in less bandwidth and may result in higher quality streams. All changes in nodes between scene graphs are determined including movement, changes of opacity, and changes in texture for example. The system then evaluates whether these changes contribute to a fragment, and whether it is possible to express these changes efficiently into the video codec's primitives. If the evaluation indicates that changes to dominant nodes can be expressed well in the video codec's primitives, then the fragment is inter-encoded. These steps are repeated for every screen update. Since the 'new scene graph' will become 'previous scene graph' in a next screen update, intermediate results can be reused from previous frames.

Figure 4:
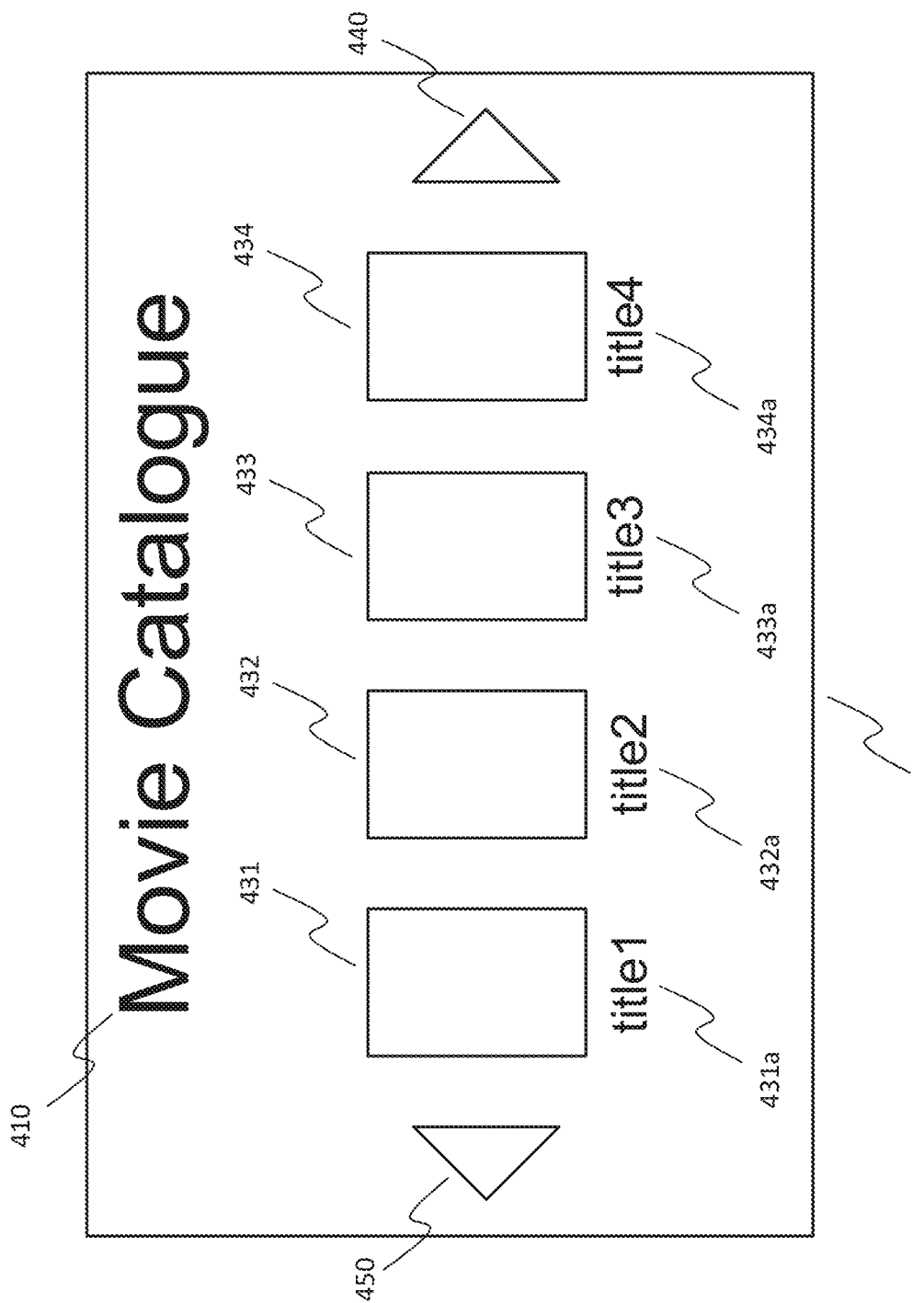
FIG. 4 shows an exemplary screen shot of an application.

FIG. 4 shows an exemplary screen shot 400 of an application that may be rendered on a display device according to the previously described methodology. As shown, the display shows a video frame of the application that has the title "Movie Catalogue." 410 The video frame also includes a static background 420 and also shows a plurality of selectable movie frames 431, 432, 433, 434. Each movie frame is selectable and associated with a separate underlying movie. The movie frames may include one or more full-motion elements (e.g. may display a clip from the movie or a transition of multiple images, or may be movable in a scripted fashion) the video frame 400 includes the titles (431*a*, 432*a*, 433*a*, 434*a*)

for each of the displayed movies. In the present example, there are four movie frames and associated titles displayed on the current screen. Additionally, the video frame includes a right pointing arrow 440 and a left pointing arrow 450 that when selected provides the user with additional movies that may be selected. This screen shot may be displayed using an application such as a web-browser or another graphical display application such as an application execution environment. It should be understood that the application may reside remote from the client device wherein video content, such as a sequence of MPEG video frames such as an MPEG elementary stream is sent from a server to the client device. The video content represents the output display of the application and the server may include the environment for executing the application and the graphical output is transformed to an MPEG elementary stream in accordance with disclosed embodiments.

Figure 5:
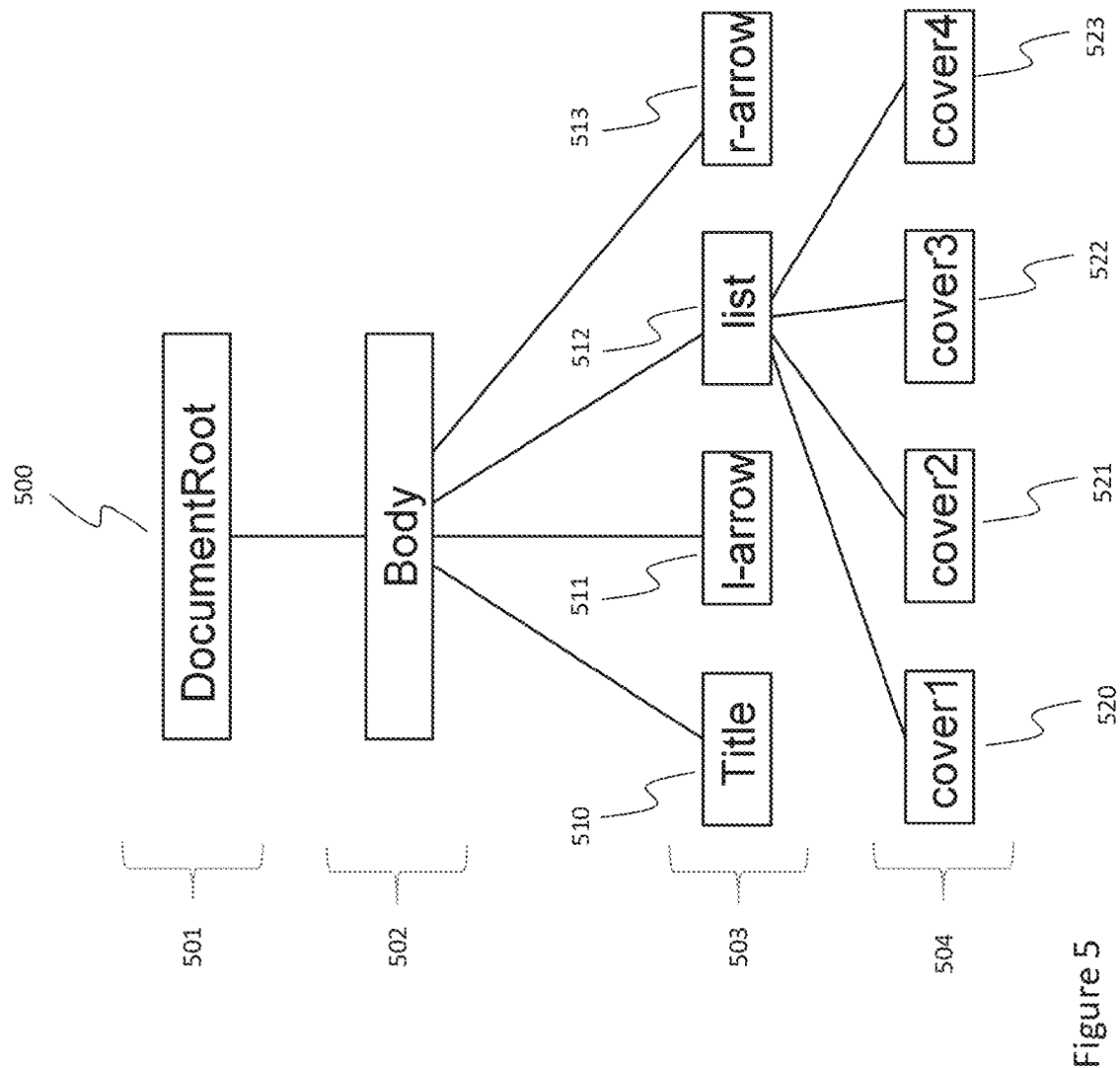
FIG. 5 shows a representative DOM tree for the application of FIG. 4.

FIG. 5 shows a representative DOM tree 500 for the application of FIG. 4. The DOM tree is a document object model representation of the hierarchical objects in a tree structure with associated nodes. A document object model is a cross-platform and language independent convention for representing and interacting with objects in HTML, XHTML and XML documents. The document object model does not include position information, fonts or effects. This information would be included in an associated CSS document (cascading style sheet document). As shown, there are four levels (501-504) to the DOM tree and the nodes entitled "Body" 502 and "list" 503 each include multiple sub-nodes. Thus, the Body node 502 includes the, Title, 1-arrow, list, r-arrow objects 510, 511, 512,513 and also the list objects of cover1, cover2, cover3, and cover4 objects 520, 521, 522, 523. The construction of DOM trees are well known in the art and are typically performed by applications, such as, web browsers.

FIG. 6 shows an exemplary scene graph model of the application screen shot of FIG. 4 that can be built based upon the DOM tree of FIG. 5. A scene graph is a data structure used for representing both logical and spatial objects for a graphical scene. The complete "scene graph state" includes also the textures, spatial information that describes how the texture is positioned into a 2D or 3D space (e.g. a transformation matrix), and all other attributes that are necessary to render the screen. In an exemplary embodiment using the OpenGL API to interface to WebKit, the spatial information for the present example is a 4×4 matrix that specifies translation (i.e. position of the texture in space), rotation, slanting, shearing, shrinking etc. For simplicity, the following examples use only 2D coordinates, but it should be understood that this could be extended to a 3D transformation matrix. Programs that employ scene graphs include graphics applications (e.g. WebKit, Adobe Acrobat, AutoCAD, CorelDraw, VRML97 etc., graphics acceleration programs and corresponding graphics acceleration hardware and additionally 3D applications and games.

The tree like structure provides a hierarchical representation wherein attributes of parent objects can be attributed to the child objects. The root object represents the entire scene 610, while child nodes of a certain node may contain a decomposition of the parent node into smaller objects. The nodes contain may contain a texture (bitmap object), a 3D transformation matrix that specifies how the texture is positioned in a 3D space, and I or other graphical attributes such as visibility and transparency. A child node inherits all attributes, transformations, filters, from the parent node.

For example, movement between scene graphs for an object such as the "cover list" 620 would indicate that each of the child objects (cover1, cover2, cover3, and cover4) 621, 622, 623, 624 would also move by an equal amount. As shown, the screen shot of FIG. 4 includes a hierarchy wherein there is a static layer 615, a cover list layer 620, and a background layer 630 and cover1, cover2, cover3, and cover4 are at a sub-layer for the cover list layer. The choice of objects that are associated with a specific layer is performed by the application execution environment, such as in a web browser.

Figure 7:
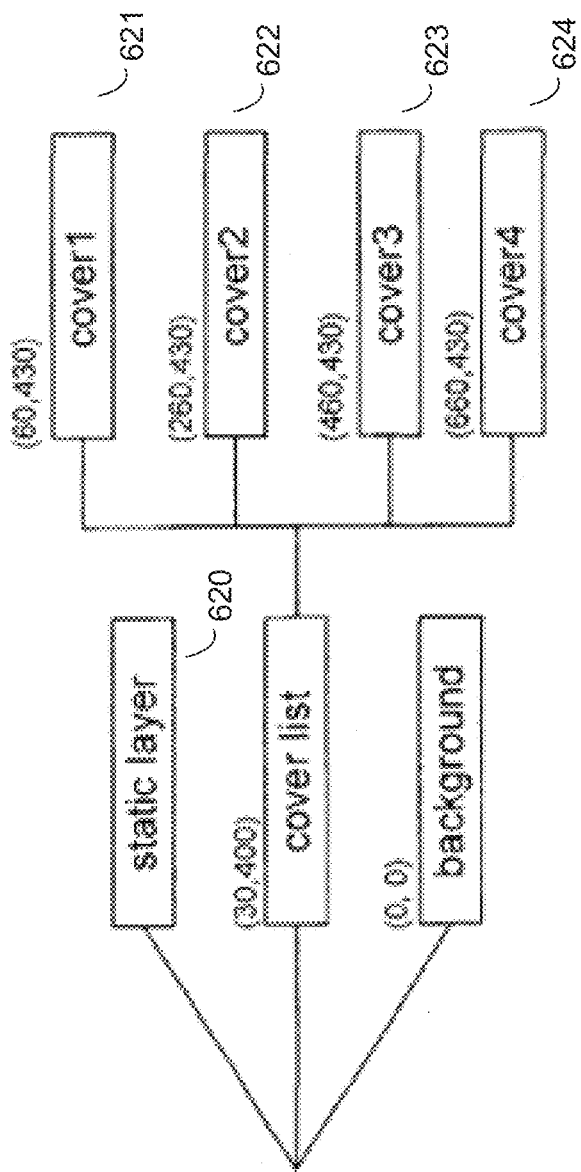
FIG. 7 shows a scene graph state with associated screen position information.

FIG. 7 shows a scene graph state with associated screen position information. As shown, the upper left position of each object is provided in scene graph (i.e. world coordinates). For example, the cover list layer 620 begins at (30, 400), which is 30 pixels in the X direction (assuming standard video X, Y coordinates) and 400 pixels down in the Y direction. This scene graph state allows a web browser or other application that produces a scene graph state to instruct a graphical processing unit or other program, such as embodiments of the invention that include a video construction module, such as that shown and discussed with respect to FIGS. 11 and 12 to render the movie covers 621, 622, 623, 624 including certain effects (shadows, reflections) and to be able to manipulate the position of these objects. The web browser or other application execution environment would then pass the scene graph state and request rendering of the screen. Often the standardized OpenGL API is used for this communication to be able to interface to many different GPUs. The OpenGL API is not only used by web browsers, but by many applications in general, across many Operating Systems (Linux, Windows, Android).

Figure 8:
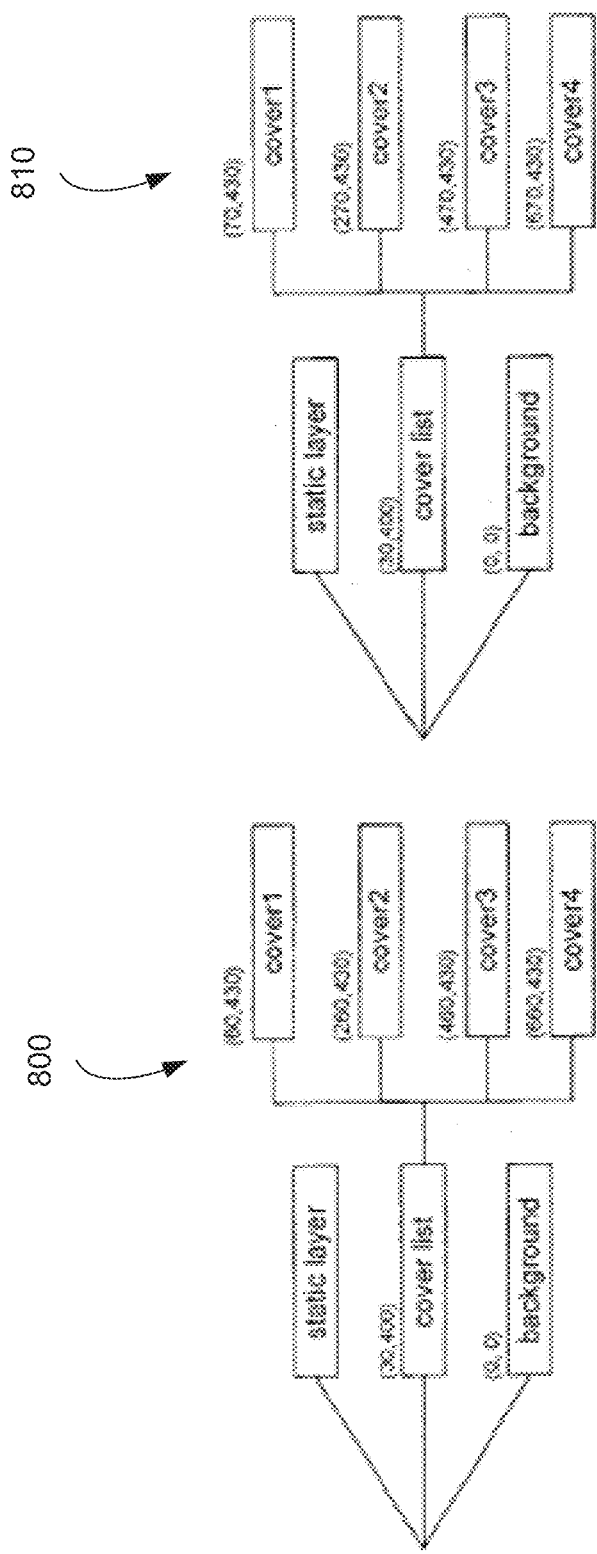
FIG. 8 shows a previous scene graph state and a current scene graph state

FIG. 8 shows a previous scene graph state 800 and a current scene graph state 810 where the previous scene graph state is on the left and the current scene graph state is on the right. As shown, in both scene graph states there are three layers, a static layer, a cover list layer, and a background layer that are all coupled to the head node. The cover list layer has an additional four objects (cover1, cover2, cover3 and cover 4) at a lower sub-layer. According to embodiments the invention, the scene graph states are compared, where for example the previous transformation matrix is subtracted from the current transformation matrix. This yields the motion of the objects relative to their previous position. It is thus discovered that cover1, cover2, cover3, and cover4 have moved 10 units in the 'x' axis direction (e.g. cover1 moves from 60,430 to 70,430 etc.) It is then determined which macroblocks are covered by the new positions of the covers, and a motion vector is set to (10, 0) for each of these macroblocks.

The scene graph comparison between the previous scene graph and the current scene graph may be performed in the following manner wherein the scene graph is transformed from a 3D to a 2D space. A node in a scene graph consists of an object having a texture (2D bitmap) and a transformation how that object is floating in space. It also contains the z-order (absolute order to render things). In OpenGL the transformation consists of a matrix:

$$\begin{array}{cccc} m[0] & m[4] & m[8] & m[12] \\ m[1] & m[5] & m[9] & m[13] \\ m[2] & m[6] & m[10] & m[14] \\ m[3] & m[7] & m[11] & m[15] \end{array}$$

This transformation is applied to an element 'a' in a 3D space by matrix multiplication. The element 'a' is identified by four points: the origin and the three top positions of the object in x, y and z direction. The bottom row (i.e. elements m[12], m[13] and m[14]) specifies translation in 3D space. Elements m[0], m[4], m[8], m[1], m[5], m[9], m[2], m[6], m[10] specify the three top positions of an object (i.e. furthest point out in x, y, z direction) where that particular point will end up by using matrix multiplication. This allows for object or frame rotation, slanting, shearing, shrinking, zooming, and translation etc. and repositioning of the object in world space at any time.

When two transformations have been applied to an object according to matrix 'm' (from the previous scene graph) and 'n' (from the current scene graph) then the "difference" between the two is m-n: matrix subtraction. The result of the matrix subtraction gives the amount of rotation, slanting, shearing, shrinking, zooming, translation etc. that has been performed to the object between the previous frame and the current frame.

Projecting a 3D image to a 2D surface is well known in the art. In one embodiment, the system first calculates projections of the 3D scene graphs onto a 2D plane, where the transformation matrices also become 2D. The motion vector (obtained by subtracting the transformation matrices) is then 2D and can be directly applied by the MPEG encoder. One motion vector per (destination) macroblock is passed, if motion was detected. The motion vector has a defined (x, y) direction, having a certain length that indicates direction and distance covered between the current frame and the previous frame. The encoder then assumes that the reference information for a macroblock is located in the reverse direction of the motion vector. If no motion was detected, then either the macroblock did not change, or it changed entirely and then it is intra-encoded.

Figure 9:
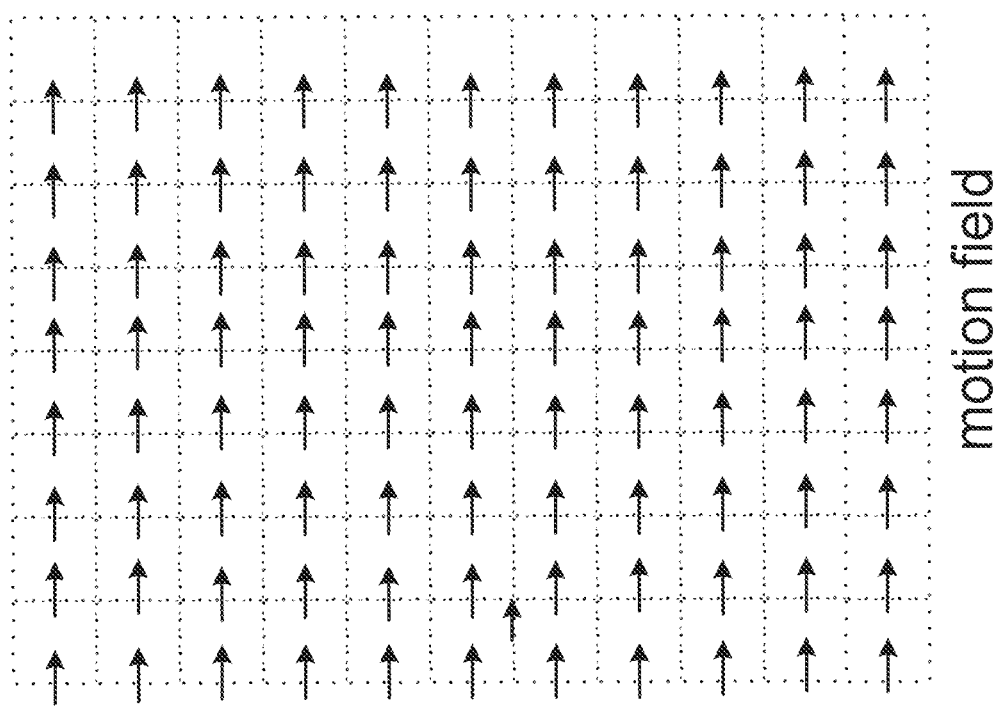
FIG. 9 shows a motion field between a first scene graph state and a second scene graph state.

FIG. 9 is an exemplary motion field that shows all of the motion vectors for macroblocks in a scene wherein all of the macroblocks have moved 10 units to the right. This might happen in a scrolling scenario where a user provides user input wanting to move elements on the display screen to the right. The user may be viewing a television or other device and may send a control signal to the server that is indicative of a right arrow key or a right-ward swipe. This control signal is received by the system and the control signal is used to generate a scene graph update within the Application Execution Environment. Once a scene graph is created, the video construction module and the internal components of the video construction module create an encoded video signal that is transmitted from the server to the client device and then displayed on the client device. The provided motion field is the result of the scene graph state comparison between the previous and current scene graph states wherein the transformation matrices are subtracted.

Figure 10:
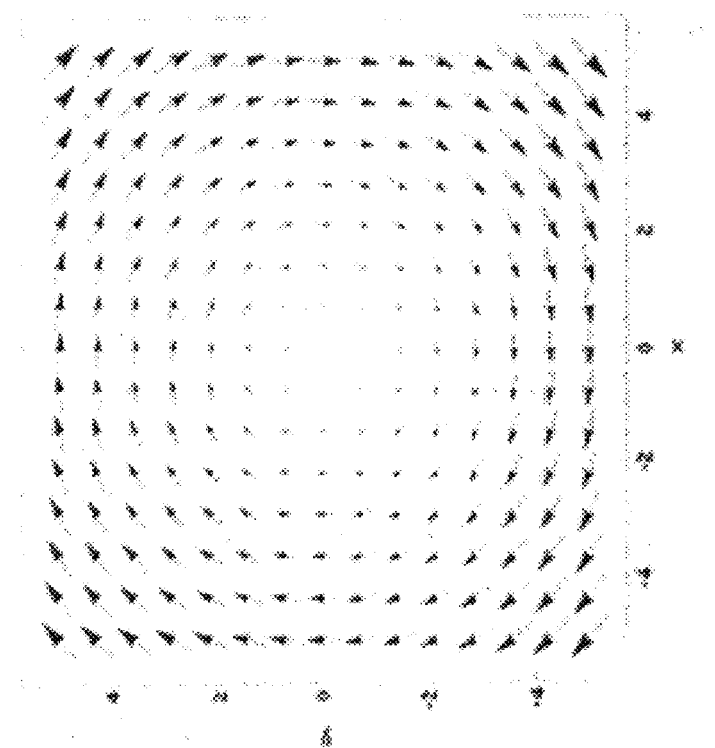
FIG. 10 shows a motion field for the rotation of each macroblock of an image.

FIG. 10 shows a motion field for the rotation of an image. For this example, the transformation matrices of the previous and current scene graph states are subtracted and the motion vectors indicate that there is a rotation of the objects within the image. Note that the macroblocks themselves are not rotated; consequently, there will be a residual error after the motion has been compensated. Thus, residual error calculations as are known in the art for motion vectors may be calculated. The residual error may be considered to be graphical information. This may be performed by the MPEG encoder or by the video construction module. Slanting, shearing, and other movements will result in other motion fields.

Hashing and caching of dirty rectangles on individual layers of a scene graph state is more efficient compared to hashing and caching of 2D projection of these layers, because the layers represent independent changes.

It should be noted that some Application Execution Environments might use one 'background' layer where it renders objects for which it chooses not to create a separate render layer. This could be a wall clock, for example. Changes to this layer are analyzed resulting in one or more dirty rectangles. In principle all rectangles depend on the background (if the background changes, parts of the background are likely visible in the rectangle due to the macroblock snapping). To avoid the background being part of every rectangle's hash function, and thus to avoid a re-rendering and re-encoding of all rectangles when the background changes (e.g. when the seconds hand moves in the wall clock object), the background is excluded from the scene graph and it is not available as an MPEG fragment.

Figure 11:
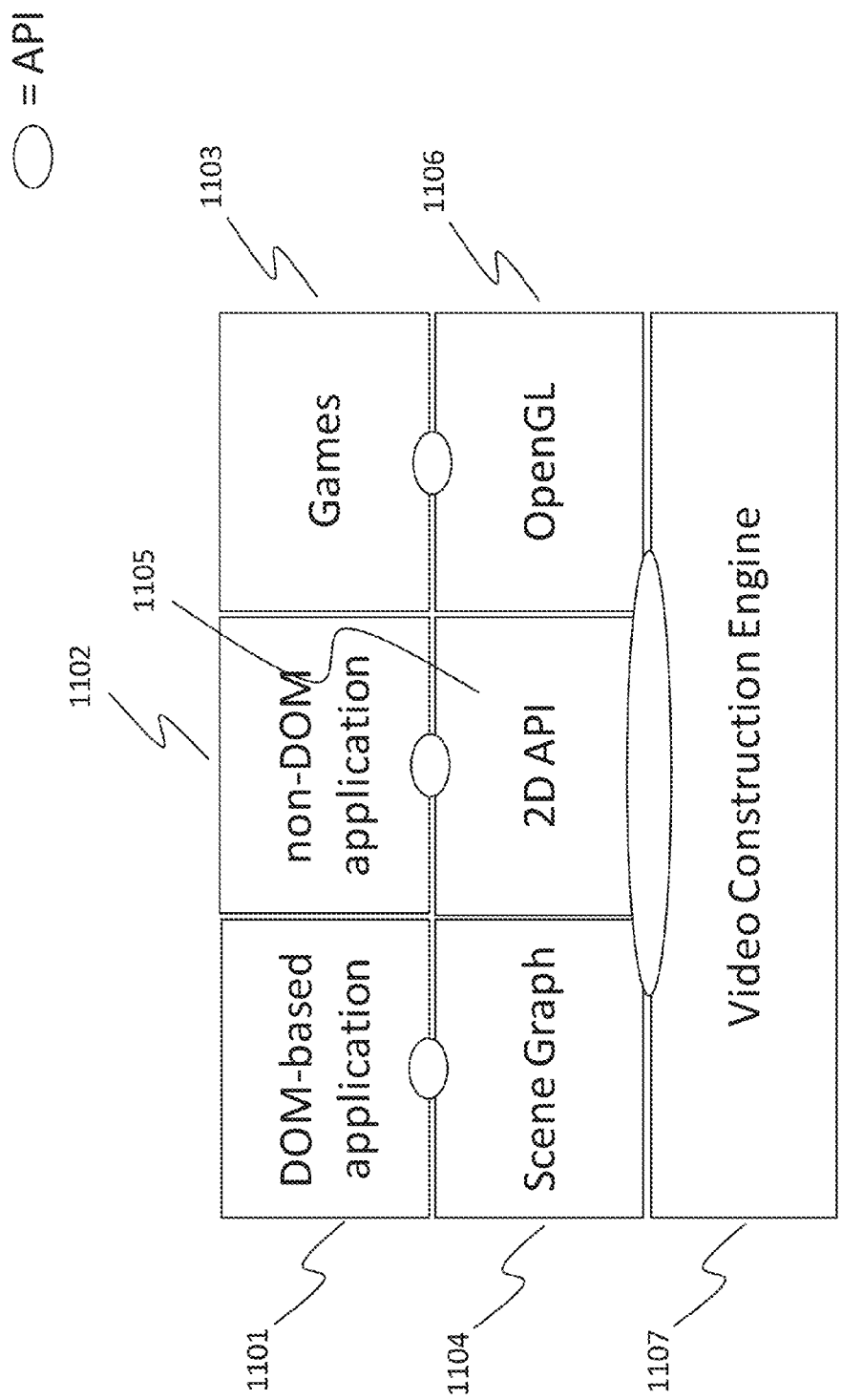
FIG. 11 shows typical embodiments of the invention.

FIG. 11 shows 3 typical embodiments of application execution engines using proprietary or standardized APIs to interact with the video construction engine. 1101 is a DOM-based application execution engine, such as for example the Webkit application execution engine. A DOM-based application execution engine may use a scene graph module (1104) to map render layers to the video construction engine (1107). Another embodiment may be a non-DOM-based application execution engine (1102) that may use a 2D API to interface to a 2D API module (1105) to interact with the video construction engine. In other embodiments, Games (1103) may interact through an OpenGL API with an OpenGL module (1106) that translates OpenGL primitives to calls into the video construction engine. In all presented embodiments, the API providers may interface with the video construction engine through a common API (1108).

Figure 12:
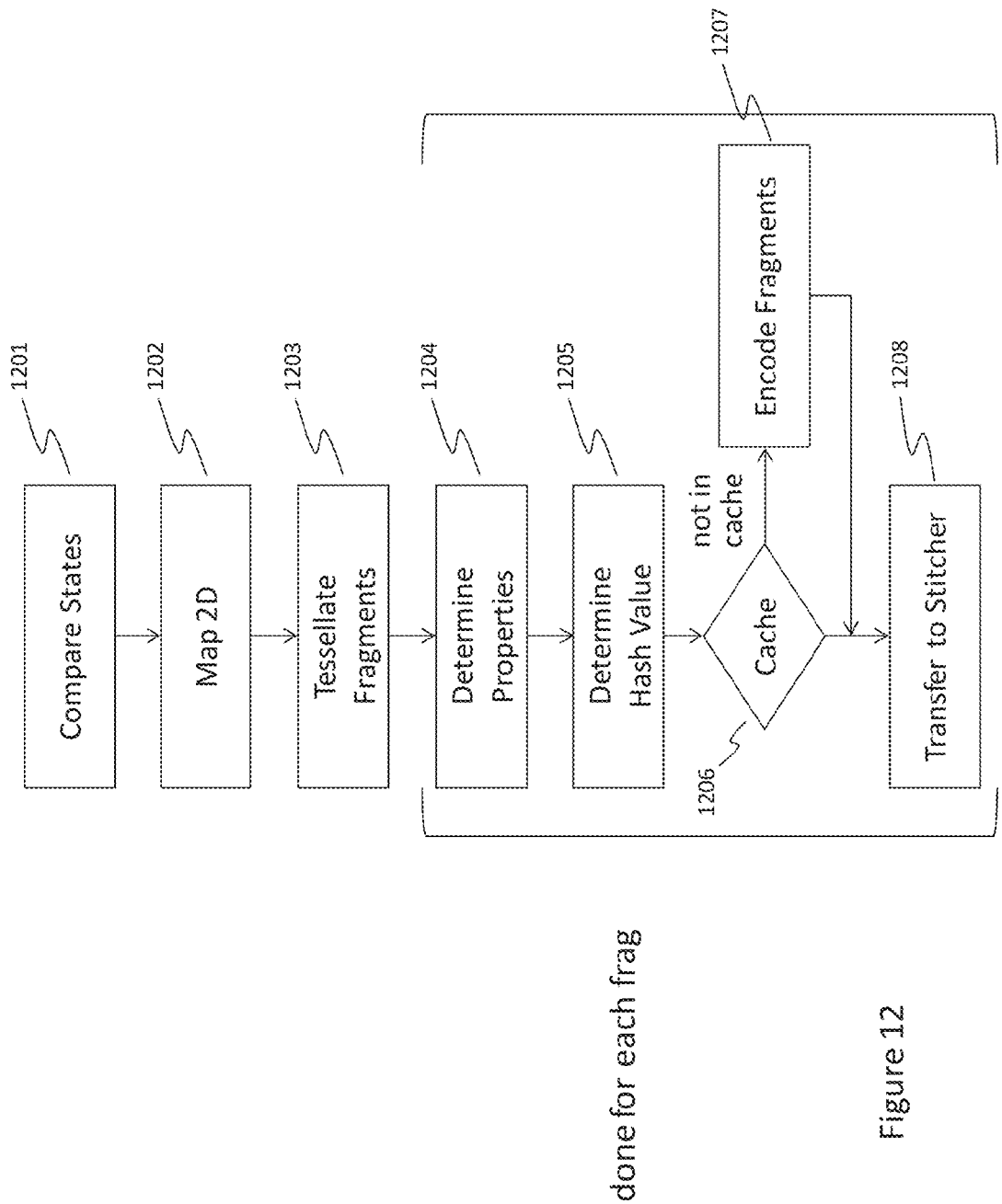
FIG. 12 shows a flow chart for implementing the functionality of relevant components of an embodiment of the invention.

FIG. 12 shows a flow chart for implementing the functionality of the video construction module, in some embodiments. Input to the comparison step 1201 is a current scene state and a previous scene state. The comparison yields a list of objects that have changed and the delta of the object's changed properties, such as for example the object's position, transformation matrix, texture, translucency, etc., or any objects that have been added or removed from the current scene.

Since embodiments of the invention may maintain objects in a 2 dimensional coordinate system, 2 dimensional (flat) objects in a 3 dimensional coordinate system or a full 3 dimensional object model in a 3 dimensional coordinate system, a mapping has to be made for each object from the scene's coordinate system to the current and previous field of view. The field of view is the extent of the observable scene at a particular moment. For each object on the list of changed, added or removed objects it is determined in step 1202 whether the object's change, addition or removal was visible in the field of view of the scene's current state or the field of view of the previous state and what bounding rectangle represented that change in said states.

Bounding rectangles pertaining to the objects' previous and current states may overlap in various constellations. Fragments, however, cannot overlap and before any fragments can be identified, overlapping conditions have to be resolved. This is done in step 1203 by applying a tessellation or tiling process as depicted in FIG. 13.

Figure 14:
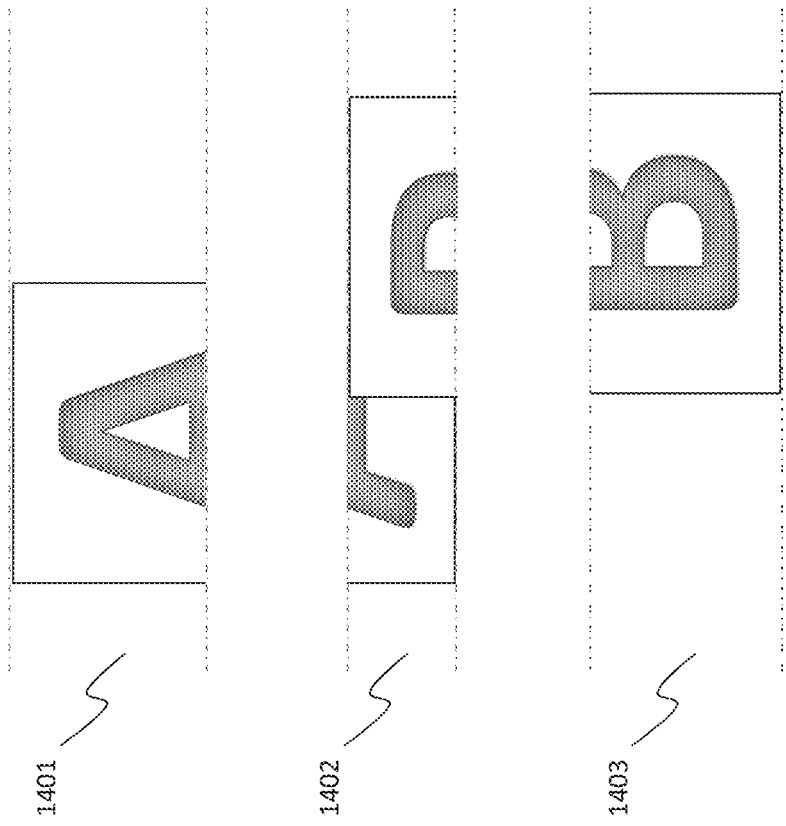
FIGS. 13 and 14 demonstrate the tessellation process.
Figure 13:
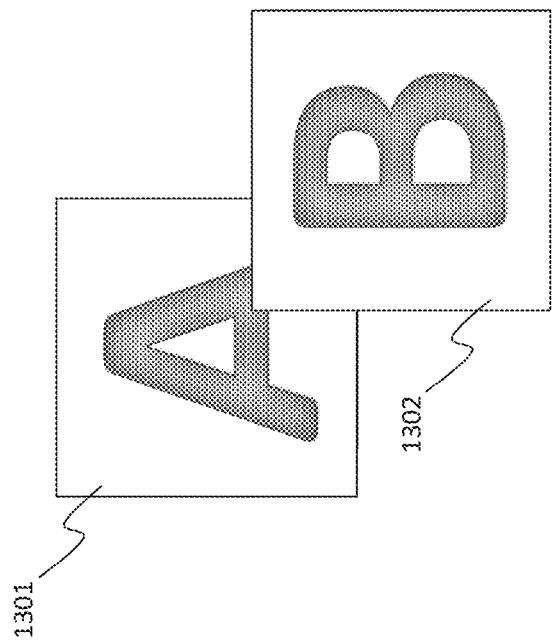

Suppose that overlapping rectangles 1301 for object A and 1302 for object B as depicted by FIG. 13 are processed by the tessellation process. Both rectangles are first expanded to only include complete macroblocks, so that the resulting tessellations can be used to derive fragments from. The tessellation process than applies an algorithm that yields non-overlapping rectangles which combined are the equivalent of the union of the original rectangles. A possible outcome of the tessellation process for the constellation as depicted in FIG. 13 is depicted in FIG. 14. In this case, the process yields 3 rectangles; 1401 to 1403. These rectangles are non-overlapping and macroblock aligned. Combined they are equivalent to the overlapping rectangles of FIG. 13. The reader will appreciate that this is just one example of many equivalent tessellation results and that the preferred tessellation may depend on policies. One policy, for example, is that rectangles representing the current state should be having preference over rectangles that represent the previous state.

Returning to step 1203, the tessellation process is first applied to the rectangles pertaining to the objects' previous states. When an object changes position or its transformation matrix changes, graphical data may be revealed that was obscured in the previous state. The object's new bounding rectangle usually only partially overlaps with the object's previous bounding rectangle. A fragment has to be made that encodes this exposure. Therefore, step 1203 first applies the tessellation process to all bounding rectangles of the objects' previous states. Subsequently, the bounding rectangles of the objects' current states are added to the tessellation process. The resulting rectangles represent the fragments that constitute the update from the previous scene state to the current scene state. Steps 1204 to 1208 are performed for each fragment.

Step 1204 determines the fragment's properties, such as whether the fragment is related to the current state or the previous state, which objects contribute to the fragment's pixel representation, and which contributing object is the dominant object. If an object dominates the fragment's pixel representation, the object's rectangle pertaining to the previous state is used as a reference window for temporal reference and the fragment may be inter encoded. If multiple objects dominate the fragment's representation a union of multiple previous state rectangles may be used as a reference window. Alternatively, the fragment's current bounding rectangle may be used as a reference window.

The fragments' properties as determined by step 1204 are used in step 1205 to form hash values that uniquely describe the fragment. A hash value typically includes the coordinates of the fragment's rectangle, the properties of contributing objects and encoding attributes that may be used to distinguish encoder specific variants of otherwise equivalent fragments such as profile, level or other codec specific settings, differences in quantization, use of the loop filter, etc. . . . If the fragment has a reference window, the hash is extended with the coordinates of the reference window in pixel units, the properties of the objects contributing to the reference window and the transformation matrix of the dominant object. All in all the hash uniquely describes the fragment that encodes the scene's current state for the fragment's rectangle and if a temporal relation could be established, a transition from the scene's previous state to the current.

In step 1206 the hash uniquely identifying the fragment is checked against a hash table. If the hash cannot be found in the hash table, the fragment description is forwarded to the fragment encoding module and step 1207 is applied. If the hash is found in the hash table, the associated encoded fragment is retrieved from the fragment caching module and step 1208 is applied.

In step 1207 fragments are encoded from pixel data pertaining to the current scene state and, if available, pixel data pertaining to the previous scene state and meta data obtained from the scene's state change (such as for example the type of fragment, transformation matrices of the objects contributing to the fragment, changes in translucency of the objects) into a stitchable fragment. It is in this step that many efficiency and quality improvements are achieved. Many steps in the encoding process, such as the intra/inter decision, selection of partitions, motion estimation and weighted prediction parameters benefit from the meta data because it allows for derivation of the spatial or temporal relations relevant for the encoding process. Examples of such benefits are provided in the remainder of this document. Once a fragment has been encoded the fragment is stored in the fragment caching module and step 1208 is applied.

Step 1208 forwards stitchable fragments to the stitching module.

It should be noted that objects are generally handled as an atomic entity, except for the background object. The background object is a fixed object at infinite distance that spans the entire field of view. A consequence of treating the background as an atomic entity would mean that small changes to the background would potentially permeate in the hash values of all fragments in which the background is visible. Therefore, the background texture is treated in the same way as disclosed in U.S. application Ser. No. 13/445,104 (Graphical Application Integration with MPEG Objects), the contents of which are hereby incorporated by reference, and changes to the background only have consequences for the fragments overlapping the dirty rectangles of the background.

The following examples relate to a DOM-based application embodiment equivalent to FIG. 11 component 1101, 1104 and 1107.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

What is claimed is:

1. A method for creating a composited video frame sequence, comprising:
   at a system including one or more processors and memory storing instructions for execution by the processor:
      comparing a current scene state with a previous scene state, wherein the current scene state includes a first plurality of objects having respective properties, and wherein the previous scene state includes a second plurality of objects having respective properties;
      detecting a difference between the respective properties of the first plurality of objects and the respective properties of the second plurality of objects;
      in accordance with the difference between the respective properties being detected, retrieving one or more pre-encoded first video fragments based on the detected difference, wherein each of the one or more pre-encoded first video fragments is a portion of a full frame of video; and
      compositing the video frame sequence, wherein the video frame sequence includes at least one of the one or more pre-encoded first video fragments.

2. The method of claim 1, wherein the one or more pre-encoded first video fragments are retrieved from a memory.

3. The method of claim 2, wherein the memory is non-volatile memory.

4. The method of claim 2, wherein the memory is volatile memory.

5. The method of claim 1, wherein the difference detected between the respective properties of the first plurality of objects and the respective properties of the second plurality of objects corresponds to at least one property from a group consisting of:
   a position, transformation matrix, texture, and translucency, of a respective object.

6. The method of claim 1, wherein detecting the difference between the respective properties of the first plurality of objects and the respective properties of the second plurality of objects includes:
   tessellating a first bounding rectangle, corresponding to at least one object of the first plurality of objects, with a second bounding rectangle, corresponding to at least one object of the second plurality of objects.

7. The method of claim 1, the method further comprising:
   in accordance with the difference between the respective properties being detected, encoding one or more second video fragments based on the detected difference, wherein the video frame sequence further includes at least one of the one or more encoded second video fragments.

8. A computer system for creating a composited video frame sequence for an application, comprising:
   one or more processors;
   memory; and
   one or more programs, wherein the one or more programs are stored in the memory and configured to be executed by the one or more processors, the one or more programs including instructions for:
      comparing a current scene state with a previous scene state, wherein the current scene state includes a first plurality of objects having respective properties, and wherein the previous scene state includes a second plurality of objects having respective properties;
      detecting a difference between the respective properties of the first plurality of objects and the respective properties of the second plurality of objects;
      in accordance with the difference between the respective properties being detected, retrieving one or more pre-encoded first video fragments based on the detected difference, wherein each of the one or more pre-encoded first video fragments is a portion of a full frame of video; and
      compositing the video frame sequence, wherein the video frame sequence includes at least one of the one or more pre-encoded first video fragments.

9. A non-transitory computer readable storage medium, storing one or more programs for execution by one or more processors of a computer system, the one or more programs including instructions for:
   comparing a current scene state with a previous scene state, wherein the current scene state includes a first plurality of objects having respective properties, and wherein the previous scene state includes a second plurality of objects having respective properties;
   detecting a difference between the respective properties of the first plurality of objects and the respective properties of the second plurality of objects;
   in accordance with the difference between the respective properties being detected, retrieving one or more pre-encoded first video fragments based on the detected difference, wherein each of the one or more pre-encoded first video fragments is a portion of a full frame of video; and
   compositing the video frame sequence, wherein the video frame sequence includes at least one of the one or more pre-encoded first video fragments.

* * * * *